(12) United States Patent
Gwozdz et al.

(10) Patent No.: US 12,708,131 B1
(45) Date of Patent: Aug. 18, 2026

(54) FOOD RECEPTACLE TRACK FOR MEAL PRODUCTION SYSTEM

(71) Applicant: Spyce Food Co., Somerville, MA (US)

(72) Inventors: Jessica Gwozdz, Winthrop, MA (US); Braden E. Knight, Somerville, MA (US); Layne S. Whitaker, Arlington, MA (US); Luke Schlueter, Somerville, MA (US)

(73) Assignee: Wonder Group Robotics, LLC, Parsippany, NJ (US)

(*) Notice: Subject to any disclaimer, the term of this patent is extended or adjusted under 35 U.S.C. 154(b) by 492 days.

(21) Appl. No.: 17/490,741

(22) Filed: Sep. 30, 2021

Related U.S. Application Data

(63) Continuation of application No. 17/077,071, filed on Oct. 22, 2020, now abandoned.

(51) Int. Cl.
*A23P 20/15* (2016.01)
*B65G 19/02* (2006.01)
*B67D 3/00* (2006.01)

(52) U.S. Cl.
CPC .............. *A23P 20/15* (2016.08); *B65G 19/02* (2013.01); *B65G 2203/0283* (2013.01); *B65G 2811/097* (2013.01); *B67D 3/0003* (2013.01)

(58) Field of Classification Search
CPC ... A23P 20/10; A23P 20/15; A47J 9/00; A47J 42/40; A47J 42/44; A47J 42/50; A47J 47/01; B65G 19/02; B65G 2203/02; B65G 2203/0266; B65G 2203/0283; B65G 2201/0202; B65G 2201/0205; B65G 2201/0208; B65G 2201/0211;
(Continued)

(56) References Cited

U.S. PATENT DOCUMENTS 3,004,651 A 10/1961 Manspeaker et al.
3,136,268 A 6/1964 Gageant
3,213,587 A 10/1965 Carruthers
(Continued)

FOREIGN PATENT DOCUMENTS

CN 108341096 A 7/2018
CN 209631066 U 11/2019
(Continued)

OTHER PUBLICATIONS

U.S. Appl. No. 17/490,452, filed Sep. 30, 2021, Hernandez et al.
(Continued)

*Primary Examiner* — Erik Kashnikow
*Assistant Examiner* — Austin Parker Taylor
(74) *Attorney, Agent, or Firm* — Wolf, Greenfield & Sacks, P.C.

(57) ABSTRACT

A meal production system may include a track having a plurality of meal receptacle holders. Each of the meal receptacle holder may be configured to receive and hold a meal receptacle, and each meal receptacle may include an opening through which an exterior portion of a received meal receptacle is accessible. The meal production system may also include at least one meal ingredient dispenser. The meal production system may also include a lifter configured to remove a meal receptacle from the meal receptacle holder by the exterior portion of the meal receptacle. The meal production system may also include a lidder.

6 Claims, 32 Drawing Sheets

(58) Field of Classification Search
CPC .......... B65G 2811/09; B65G 2811/095; B65G 2811/097; B67D 3/0003; B64D 83/00
USPC ........... 426/231; 414/222.01, 222.13; 222/52
See application file for complete search history.

(56) References Cited

U.S. PATENT DOCUMENTS

| | | | | |
|---|---|---|---|---|
| 3,322,306 | A | 5/1967 | Munderich | |
| 3,411,765 | A | 11/1968 | Schmidt | |
| 3,859,904 | A | 1/1975 | Carriazo | |
| 4,286,911 | A | 9/1981 | Benjamin | |
| 4,685,387 | A | 8/1987 | Hanson et al. | |
| 4,905,525 | A | 3/1990 | Kurfürst | |
| 4,919,950 | A | 4/1990 | Mak | |
| 4,944,218 | A | 7/1990 | Cresson | |
| 4,978,542 | A | 12/1990 | Buckley | |
| 5,113,753 | A | 5/1992 | Robinson | |
| 5,132,914 | A | 7/1992 | Cahlander et al. | |
| 5,172,328 | A | 12/1992 | Cahlander et al. | |
| 5,386,762 | A | 2/1995 | Gokey | |
| 5,493,958 | A | 2/1996 | Naramura | |
| 5,540,943 | A * | 7/1996 | Naramura | A21C 9/04 426/231 |
| 5,562,183 | A | 10/1996 | Naramura | |
| 5,964,381 | A | 10/1999 | El-Hage et al. | |
| 6,269,850 | B1 | 8/2001 | Price et al. | |
| 6,619,339 | B2 | 9/2003 | Price et al. | |
| 6,662,969 | B2 | 12/2003 | Peeler et al. | |
| 8,272,535 | B2 | 9/2012 | Huang | |
| 9,532,575 | B1 | 1/2017 | Donisi et al. | |
| 10,143,228 | B2 | 12/2018 | Vardakostas et al. | |
| 10,219,535 | B2 | 3/2019 | Vardakostas et al. | |
| 10,455,987 | B1 | 10/2019 | He | |
| 10,492,358 | B1 | 12/2019 | Wilson et al. | |
| 10,905,150 | B2 * | 2/2021 | Vardakostas | A23P 20/20 |
| 11,779,024 | B2 | 10/2023 | Daubertais | |
| 12,089,788 | B1 | 9/2024 | Schlueter et al. | |
| 2002/0176921 | A1 * | 11/2002 | Torghele | A21C 1/142 426/549 |
| 2004/0173103 | A1 | 9/2004 | Won | |
| 2005/0256774 | A1 * | 11/2005 | Clothier | G06Q 10/06 705/15 |
| 2006/0071043 | A1 * | 4/2006 | Taguchi | B65G 1/065 224/231 |
| 2009/0056562 | A1 | 3/2009 | Julian et al. | |
| 2011/0114634 | A1 | 5/2011 | Nevarez | |
| 2011/0277420 | A1 | 11/2011 | Peters et al. | |
| 2012/0012441 | A1 | 1/2012 | Ishino et al. | |
| 2012/0294108 | A1 | 11/2012 | Dickson, Jr. et al. | |
| 2013/0200064 | A1 * | 8/2013 | Alexander | A47J 36/2483 219/441 |
| 2014/0230660 | A1 * | 8/2014 | He | A47J 27/14 99/325 |
| 2014/0299227 | A1 | 10/2014 | Dix | |
| 2015/0197353 | A1 | 7/2015 | Bergmann | |
| 2017/0150843 | A1 | 6/2017 | Rosalia et al. | |
| 2017/0172165 | A1 | 6/2017 | Annema et al. | |
| 2017/0172350 | A1 | 6/2017 | Farid et al. | |
| 2017/0290345 | A1 | 10/2017 | Garden et al. | |
| 2018/0099814 | A1 * | 4/2018 | McCafferty | B65G 47/54 |
| 2018/0099817 | A1 * | 4/2018 | Murakami | B66C 15/045 |
| 2018/0310773 | A1 | 11/2018 | Sekar et al. | |
| 2019/0059645 | A1 | 2/2019 | Nelson et al. | |
| 2019/0104883 | A1 | 4/2019 | Nelson | |
| 2019/0125126 | A1 * | 5/2019 | Cohen | G07F 17/0064 |
| 2019/0133372 | A1 | 5/2019 | Lehman et al. | |
| 2020/0154949 | A1 | 5/2020 | Klein et al. | |
| 2020/0375406 | A1 | 12/2020 | He | |
| 2021/0068440 | A1 | 3/2021 | Ait Bouziad | |
| 2021/0100374 | A1 | 4/2021 | Lo | |
| 2022/0108250 | A1 | 4/2022 | Pietz et al. | |
| 2024/0225075 | A1 | 7/2024 | Gwozdz et al. | |

FOREIGN PATENT DOCUMENTS

| | | | | |
|---|---|---|---|---|
| CN | 211066218 | | 7/2020 | |
| EP | 0 296 496 | A2 | 12/1988 | |
| EP | 1 415 919 | A1 | 5/2004 | |
| GB | 1 452 620 | A | 10/1976 | |
| WO | WO-2016156096 | A1 * | 10/2016 | A47J 31/525 |

OTHER PUBLICATIONS

U.S. Appl. No. 17/491,148, filed Sep. 30, 2021, Schlueter et al.
U.S. Appl. No. 17/490,605, filed Sep. 30, 2021, Gwozdz et al.
U.S. Appl. No. 18/612,417, filed Mar. 21, 2024, Gwozdz et al.
U.S. Appl. No. 18/652,229, filed May 1, 2024, Whitaker et al.
U.S. Appl. No. 18/813,848, filed Aug. 23, 2024, Schlueter et al.
PCT/US2024/027173, Jul. 30, 2024, Invitation to Pay Additional Fees.
PCT/US2024/027173, Sep. 23, 2024, International Search Report and Written Opinion.
Invitation to Pay Additional Fees mailed Jul. 30, 2024 in connection with PCT/US2024/027173.
International Search Report and Written Opinion mailed Sep. 23, 2024 in connection with PCT/US2024/027173.
International Preliminary Report on Patentability mailed Nov. 13, 2025 in connection with PCT/US2024/027173.

* cited by examiner 100
110
112
114
116
200
120
130
132
134
136
140
122
126
200
202
124
152
250
158
154
153
150
250
156

FOOD RECEPTACLE TRACK FOR MEAL PRODUCTION SYSTEM

RELATED APPLICATIONS

This Application is a continuation of U.S. application Ser. No. 17/077,071, filed Oct. 22, 2020, the disclosure of which is incorporated herein by reference in its entirety.

FIELD

Disclosed embodiments are related to a food receptacle track for a meal production system and related methods of use.

BACKGROUND

Food handling and cooking has been traditionally performed by humans. In some cases, robotic systems have attempted to emulate aspects of human cooking, but such systems have been slower than human cooks or have other drawbacks.

SUMMARY

In some embodiments, a method of operating a meal production system includes determining a threshold distance between meal receptacles positioned on a track, moving a first meal receptacle along the track, moving a second meal receptacle along the track behind the first meal receptacle, slowing the first meal receptacle at a position associated with a first meal ingredient dispenser positioned above the track, dispensing a first meal ingredient onto the first meal receptacle from the first meal ingredient dispenser, slowing the second meal receptacle behind the first meal receptacle, moving the first meal receptacle along the track after the first meal ingredient is dispensed, and moving the second meal receptacle along the track after the first meal ingredient is dispensed into the first meal receptacle, where the second meal receptacle is kept at a distance greater than or equal to the threshold distance relative to the first meal receptacle.

In some embodiments, a method of operating a meal production system includes placing a first meal receptacle on a first meal receptacle holder of a track, where the first meal receptacle holder provides an opening though which an exterior portion of the first meal receptacle is physically accessible. The method also includes moving the first meal receptacle holder along the track, depositing at least one meal ingredient onto the first meal receptacle, and removing the first meal receptacle from the first meal receptacle holder by the exterior portion.

In some embodiments, a meal production system includes a track including a plurality of meal receptacle holders, where each of the plurality of meal receptacle holders is configured to receive and hold a meal receptacle, and where each such meal receptacle holder includes an opening through which an exterior portion of a received meal receptacle is accessible. The meal production system also includes at least one meal ingredient dispenser configured to dispense at least one meal ingredient onto the meal receptacle holders, and a lifter configured to contact the exterior portion of a meal receptacle held in one of the plurality of meal receptacle holders and remove the meal receptacle from the meal receptacle holder.

In some embodiments, a meal production system includes a track including a meal receptacle holder, where the meal receptacle holder is configured to receive and hold a meal receptacle, where the meal receptacle holder includes an opening through which an exterior portion of a received meal receptacle is accessible, and where the meal receptacle holder includes an open portion. The meal production system also includes a lifter configured to contact the exterior portion of a meal receptacle held in the meal receptacle holder and remove the meal receptacle from the meal receptacle holder, where the lifter is configured to move the meal receptacle holder out of the open portion of the meal receptacle holder, and a lidder including a lid positioned to capture a front portion of the meal receptacle as the lifter moves the meal receptacle holder out of the open portion of the meal receptacle holder to close the meal receptacle.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
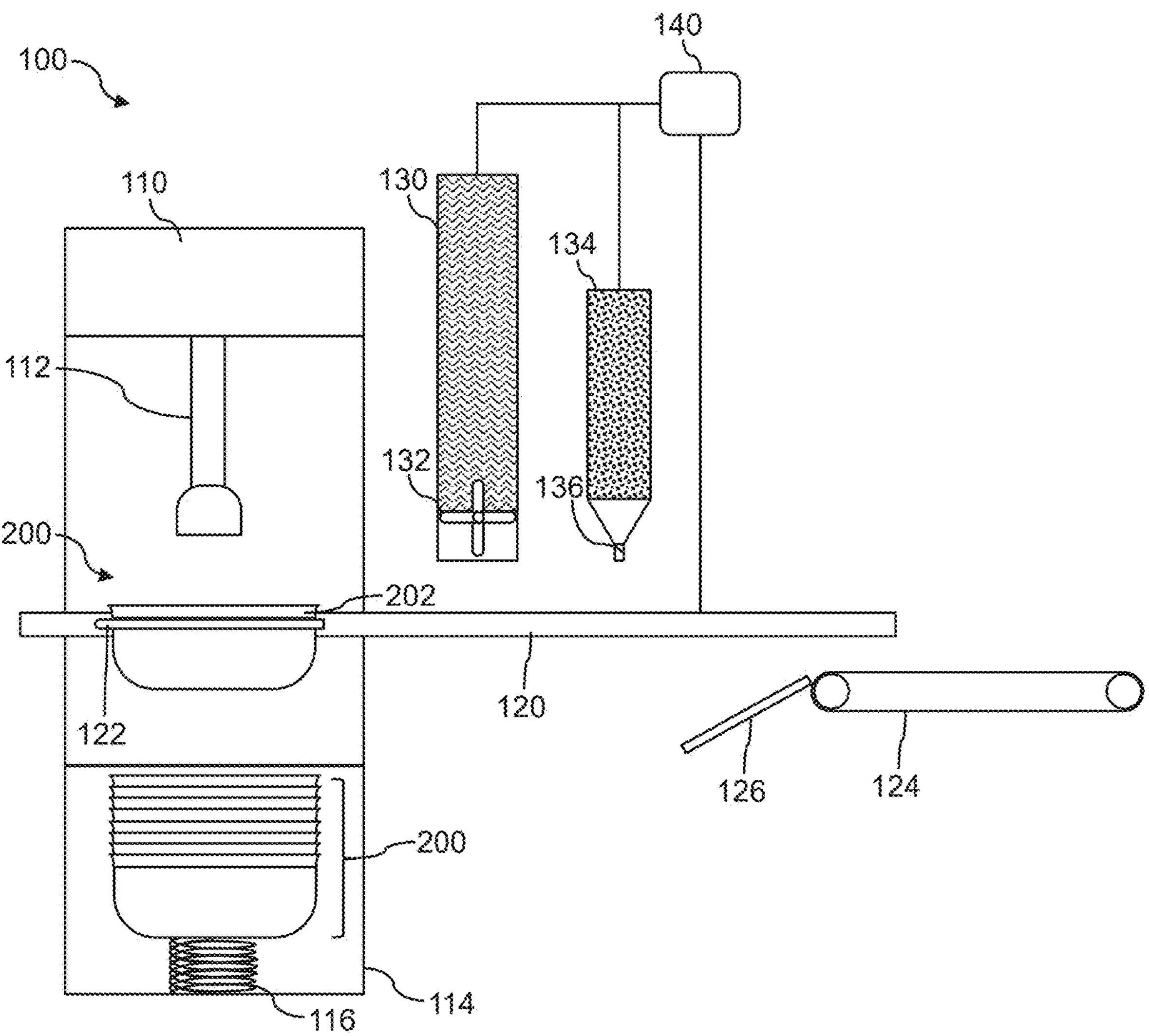
FIG. 1 is a side schematic of one embodiment of a meal production system.

Take out or fast food from quick service restaurants is a staple of many diets around the world. Quick service restaurants may spend a significant percentage of their revenue on labor costs. These operating costs may prevent restaurants from being able to sell fast, convenient meals at affordable prices. A significant portion of employee time in food service may involve moving a food receptacle (e.g., bowl, plate, tray, etc.) down a meal assembly line. Additionally, employee time may be spent packaging and preparing the packaged meal for transport by a customer.

In view of the above, the inventors have recognized the benefits of an automated meal production system that enables automatic preparation of meal orders, including custom meal orders. In particular, the inventors have recognized the benefits of an automated track for an automated meal production system that moves meal receptacles through the meal production system. The automated track may enable high throughput of meal receptacles when compared with conventional automated conveyor belts, while allowing custom meals to be assembled in the meal receptacles. The inventors have also recognized the benefits of an automated track that automatically moves the meal receptacles onto the track and removes the meal receptacles from the track. Accordingly, the automated track may ensure there are no delays or sanitation concerns related to supplying and removing a meal receptacle from the track. The inventors have also recognized the benefits of an automated track that automatically closes a meal receptacle to improve sanitation and reduce the amount of touching of the meal receptacle by a human employee. The closed state of the meal receptacle may allow the meal receptacle to be easily transported by a user with reduced risk of spillage or contamination.

In some embodiments, a meal production system includes a track having a plurality of meal receptacle holders. The track is configured to move each of the meal receptacle holders along the track. A meal receptacle may be placed on a meal receptacle holder so that the meal receptacle may be moved along the track. According to exemplary embodiments described herein, the meal production system may also include at least one meal ingredient dispenser positioned above the track and configured to dispense a meal ingredient into a meal receptacle positioned below the at least one meal ingredient dispenser. The at least one meal ingredient dispenser may be configured to dispense solid, semi-solid, or liquid meal ingredients into a meal receptacle, such that a custom meal order including one or more meal ingredients may be prepared by the meal production system.

In some embodiments, a meal production system may include a track including a plurality of meal receptacle holders, where the track moves the meal receptacle holders along a path defined by the track. In particular, the track may be configured to move a meal receptacle holder underneath a plurality of meal ingredient dispensers that may each contain a meal ingredient that can be dispensed into a meal receptacle positioned on one of the meal receptacle holders. The meal receptacle holders may be movable in two track directions along the track: forward and backward. The track may be continuous, such that the meal receptacle holders may move continuously in a single direction around the track. The track may be configured to move respective meal receptacle holders independent from one another along the track. That is, a first meal receptacle holder may be moved at an individualized speed and position relative to a second meal receptacle holders. Additionally, a first meal receptacle holder may be moved forward, backward, slowed, or stopped independent of a second meal receptacle holder. As will be discussed further herein, such an arrangement allows for high throughput of meal receptacle holders for a custom meal order. In some embodiments, the track may be configured as a magnetic conveyor that allows two or more of the meal receptacle holders to be moved independently.

According to exemplary embodiments described herein, a meal production system may have a meal receptacle lifter associated with a track. The meal receptacle lifter may be configured to remove a meal receptacle carried by a meal receptacle holder. For example, once a meal receptacle has passed one or more meal ingredient dispensers of the meal production system and is at the end of a meal assembly portion of the meal production system, the meal receptacle lifter may remove the meal receptacle from a meal receptacle holder. According to exemplary embodiments described herein, a meal receptacle may be removed from a meal receptacle holder by applying force or otherwise holding a meal receptacle by an exterior portion (e.g., a bottom portion) of the meal receptacle. For example, in some embodiments the meal production system may include a conveyor belt configured to engage a bottom portion or some other exterior portion of a meal receptacle located on a meal receptacle holder to remove the meal receptacle from the meal receptacle holder. In some embodiments, the meal production system may include ramped (i.e., inclined) extractor plate configured to lift a meal receptacle away from a meal receptacle holder. The extractor plate may be ramped or inclined relative to a direction of movement of the meal receptacle holder. For example, the extractor plate may be ramped or inclined relative to a horizontal plane. In some embodiments, a meal production system may include a meal receptacle lifter having conveyor belt that is ramped (i.e., inclined) relative to a direction of movement of the meal receptacle holder. Such arrangements may promote sanitary conditions during meal production, as meal receptacle lifter does not contact food containing portions of the meal receptacle or other portions nearby food containing portions. According to exemplary embodiments described herein, a meal receptacle holder may allow an exterior portion of a meal receptacle to be physically accessible so that the meal receptacle lifter may contact the meal receptacle.

In some cases, it may be desirable for a lifter to selectively move to engage a meal receptacle held by a meal receptacle holder. In some embodiments, a lifter maybe coupled to an actuator (e.g., a linear actuator) such that the lifter may move in one or more degrees of freedom. For example, a lifter may move from a first disengaged position where the lifter is not engaged with a meal receptacle to a second engaged position where the lifter is engaged with the meal receptacle to remove the meal receptacle from the meal receptacle holder. In one such embodiment, the first position may be a first vertical position and the second position may be a second, higher vertical position where the lifter actively engages a bottom portion of the meal receptacle. In other embodiments, any suitable arrangement for a lifter that moves between an engaged position and a disengaged position may be employed, as the preset disclosure is not so limited.

According to exemplary embodiments described herein, a meal receptacle holder may be configured to support a meal receptacle so that the meal receptacle may be moved along a track. As discussed previously, in some embodiments a meal receptacle holder may be configured so that an exterior portion such as a bottom portion of a meal receptacle is physically accessible such that the meal receptacle may be removed from the meal receptacle holder by interaction with the exterior portion. In some embodiments, a meal receptacle holder may hold a meal receptacle by a rim of the meal receptacle. That is, the meal receptacle holder may contact one or more side walls of the meal receptacle to support the meal receptacle on the track while also being configured to provide physical access to the bottom of the meal receptacle. In some embodiments, the meal receptacle holder may support a meal receptacle by the bottom portion of the meal receptacle. In one such embodiment, the meal receptacle holder may include an opening through which the bottom portion of the meal receptacle is accessible. Accordingly, a first region of the bottom portion of the meal receptacle may support the meal receptacle on the meal receptacle holder, and a second region of the bottom portion may be physically accessible to a meal receptacle lifter. In some embodiments, a meal receptacle holder may support a meal receptacle by the bottom portion of the meal receptacle, such that an exterior portion of the meal receptacle is accessible to a lifter. For example, one or more exterior walls of the meal receptacle may be accessible to the lifter so that the meal receptacle may be removed from the meal receptacle holder by the lifter.

In some embodiments, a meal receptacle holder may constrain the movement of a supported meal receptacle in one or more directions. For example, in some embodiments a meal receptacle may be constrained in at least three directions so that the meal receptacle is secured during motion along the track. In some embodiments, the meal receptacle holder may allow the meal receptacle to move relative to the meal receptacle holder in one or more directions. For example, a meal receptacle holder may include an open end through which the meal receptacle may be removed from the meal receptacle holder. In some embodiments, a meal receptacle may be moved relative to a meal receptacle holder out of an open end of the meal receptacle holder in a horizontal and/or vertical direction. Of course, any suitable arrangement for a meal receptacle holder is contemplated, as the present disclosure is not so limited.

In some embodiments, a meal production system may include a lidder configured to automatically close a meal receptacle as the meal receptacle is removed from a track of the meal production system. The lidder may include one or more lids that are complementary to a meal receptacle, such that the lids are configured to close an internal volume of the meal receptacle when attached to the meal receptacle. In some embodiments, the lidder is configured to hold a lid at an incline relative to a direction of movement of a meal receptacle holder and/or meal receptacle. The lid may be angled such that a leading edge of the lid is a lowermost portion of the lid closest to the path of the meal receptacle. The leading edge of the lid may be positioned in the path of the meal receptacle, such that the meal receptacle is configured to contact the leading edge of the lid as the meal receptacle moves along the path. In particular, a leading edge of the meal receptacle may be configured to engage the leading edge of the lid. As the leading edges of the lid and meal receptacle engage one another, the meal receptacle may capture the lid and carry the lid in the same direction as the meal receptacle. In some embodiments, the lidder may include a passageway with a predetermined height. The height of the passage may be determined such that as the meal receptacle and engaged lid pass through the passageway the lid is pressed onto the meal receptacle to close the meal receptacle. That is, the height may be such that the lid and meal receptacle are not able to pass through unless the lid has closed the meal receptacle. Of course, any suitable arrangement for pressing the lid onto the meal receptacle is contemplated, the present disclosure is not so limited.

According to exemplary embodiments described herein a meal production system may include a meal receptacle dispenser configured to place a meal receptacle on a meal receptacle holder of the meal production system. In contrast to continuous production equipment, a meal production system according to exemplary embodiments described herein may produce a meal to order. Accordingly, a meal receptacle may wait to be placed on a track of the meal production system until a meal is ordered. The meal receptacle dispenser may allow a meal receptacle to be selectively placed on a meal receptacle holder once a meal is ordered, where a plurality of meal receptacles may be stored inside of the meal receptacle holder. Of course, in other embodiments, a meal receptacle may be placed on a track of the meal production system before an order is placed. According to one such embodiment, the meal receptacle may remain stationary on the track until a meal is ordered, at which point the meal receptacle may be advanced along the track. In some embodiments, the meal receptacle dispenser may be configured to lift a meal receptacle above a track, and subsequently drop or the meal receptacle onto a meal receptacle holder. Of course, a meal receptacle dispenser may have any suitable arrangement to selectively place a meal receptacle on a meal receptacle holder, as the present disclosure is not so limited.

In some embodiments, a track of a meal production system may include multiple meal receptacle holders and associated meal receptacles moving independently at the same time. Accordingly, it may be desirable to control a first meal receptacle holder and a second meal receptacle holder in such a manner that the first meal receptacle holder and second meal receptacle and/or respective meal receptacles do not collide with one another, while still providing for high throughput of the bowls. Accordingly, the meal production system may be configured to determine a threshold distance between a first meal receptacle holder and a second meal receptacle holder and/or a first meal receptacle and a second meal receptacle positioned on the track. The threshold distance may be a collision distance between the first meal receptacle holder and the second meal receptacle holder and/or the first meal receptacle and the second meal receptacle. As the meal receptacle holders are moved along the track, the meal production system may maintain a distance greater than or equal to the threshold distance between the first meal receptacle holder and second meal receptacle holder and/or the first meal receptacle and second meal receptacle. Accordingly, if the first meal receptacle holder is stopped underneath a meal ingredient dispenser, the second meal receptacle holder following the first meal receptacle may be correspondingly stopped at a distance greater than or equal to the threshold distance in order to prevent a collision.

According to exemplary embodiments described herein, a meal production system may be configured to assemble a meal in a meal receptacle. That is, the meal production system of exemplary embodiments herein may be configured to dispense one or more meal ingredients into a meal receptacle. In some embodiments, a meal receptacle may be configured as a bowl. In other embodiments, a meal receptacle may be configured as a plate. In some embodiments, a meal receptacle may be configured as a tray including one or more food receiving regions. Of course, any suitable meal receptacle having any suitable shape may be employed with a meal production system according to exemplary embodiments described herein, as the present disclosure is not so limited. In some embodiments, a meal production system may employ multiple types, shapes, constructions, and/or sizes of meal receptacles. For example, a meal production system may employ two different sizes of bowls. Depending on an order from a user, the meal production system may assign the ordered meal to one of the two bowl sizes. A track of the meal production system may be configured to support both bowl sizes, such that either size of bowl may be conveyed along the track to assemble a meal as discussed further herein. In some embodiments, meal receptacles of different types, shapes, sizes, and/or constructions may be held in meal receptacle dispensers that are configured to dispense a meal receptacle into a meal receptacle holder. In some embodiments, a lidder according to exemplary embodiments described herein may be configured to dispense different sizes and/or shapes of lids to correspond to a size and shape of a meal receptacle. The lidder may dispense different lids for different meal receptacles, such that a meal production system may produce enclosed meals in different types, sizes, and/or shapes of containers using a shared track.

According to exemplary embodiments described herein, one or more meal ingredient dispensers may be employed to dispense meal ingredients into a meal receptacle. The meal ingredient dispensers may be configured to dispense solids, semi-solids, or liquid meal ingredients. Additionally, the meal ingredient dispensers may be configured to dispense hot ingredients, cold ingredients, or room temperature ingredients. A meal ingredient dispenser may dispense raw ingredients and/or prepared ingredients. For example, a meal ingredient dispenser may dispense proteins, vegetables, grains, fruit, toppings, that are in raw form or pre-prepared. The meal ingredient dispensers according to exemplary embodiments described herein may be configured to dispense a predetermined volume or weight of a meal ingredient, depending at least partly on a custom order from a user. That is, a user may select a meal ingredient, an amount of the meal ingredient, and a specific region of a meal receptacle into which the meal ingredient is dispensed based on a recipe or custom input. For example, a user may request a meal containing three meal ingredients, where each meal ingredient is configured to be dispensed from a corresponding meal ingredient dispenser in a chosen or predetermined volume. In some embodiments, a meal ingredient dispenser may be formed as a hopper including a paddle wheel configured to release ingredients that fall by gravity into a meal receptacle. In other embodiments, a meal ingredient dispenser may employ a pump to dispense a liquid meal ingredient (e.g., a sauce) into a meal receptacle. Of course, any suitable dispenser may be employed to dispense one or more meal ingredients into a meal receptacle positioned on a track, as the present disclosure is not so limited.

In some embodiments, a meal production system may be configured to receive an order from one or more users, and subsequently the meal production system may prepare the ordered meal. A meal production system may receive an input from one or more users at one or more input devices. Representative input devices may be tablets, point-of-sale devices, mobile devices (e.g., smartphones), personal computers (e.g., desktops, laptops, etc.), or any other suitable input device. The one or more input devices may be located near the meal production system (e.g., in the same building or room), or may be remotely located. The one or more input devices may communicate wirelessly or wired with a machine controller of the meal production system that may control one or more components of the meal production system. At the one or more input devices a user may be able to select one or more meal ingredients to form a meal. In some embodiments, the user may select independent meal ingredients and custom quantities of those ingredients. In some embodiments, the user may select from a plurality of predetermined recipes which specify meal ingredients in predetermined quantities. In some embodiments, the user may select from a plurality of predetermined recipes, and further customize those recipes by increasing quantity of ingredients (e.g., selecting extra protein) or selecting add-ons (e.g., toppings, sides, etc.). While in some embodiments a user may be customer, in other embodiments the user may be an employee (e.g., chef, cashier, waiter, etc.) or any other suitable user, as the present disclosure is not so limited. In some embodiments, a first user (e.g., a customer) may submit an order, and a second user (e.g., an employee) may modify the order.

According to exemplary embodiments described herein, a meal production system may be operated by a machine controller. The machine controller may include one or more processors configured to execute computer readable instructions stored in volatile or non-volatile memory. The machine controller may communicate with one or more actuators associated with various elements of the meal production system (e.g., track, meal ingredient dispensers, lidder, meal receptacle dispenser, etc.) to control movement of the various elements. The machine controller may receive information from one or more sensors that provide feedback regarding the various elements of the meal production system. For example, the machine controller may receive or may receive position information regarding a meal receptacle holder. In this manner, the machine controller may implement proportional control, integral control, derivative control, or a combination thereof (e.g., PID control). Of course, other feedback control schemes are contemplated, and the present disclosure is not limited in this regard. Any suitable sensors in any desirable quantities may be employed to provide feedback information to the machine controller. Accelerometers, rotary encoders, potentiometers, optical sensors, and cameras may be employed in coordination with desirable processing techniques (e.g., machine vision). The machine controller may also communicate with other machine controllers, computers, or processors on a local area network, wide area network, or internet using an appropriate wireless or wired communication protocol. In some embodiments, a machine controller may execute computer readable instructions based at least in part on input from a user. For example, a machine controller may receive a recipe or custom order including a series of actions to be executed by the meal production system. The machine controller may execute the instructions based at least partly on the recipe or custom order to prepare a meal.

According to exemplary embodiments described herein, various components of a meal production system may be movable with one or more actuators. That is, various elements may include one or more actuators that provide one or more corresponding degrees of freedom. Actuators that control elements such as meal dispensers and meal receptacle holders may include any suitable electromechanical, pneumatic, or hydraulic actuator. For example, actuators for use with exemplary embodiments described herein may include stepper motors with lead screws, linear actuators, rigid chain actuators, pneumatic linear actuators, hydraulic linear actuators, and others. As noted previously, actuators of exemplary embodiments described herein may be connected or otherwise controlled by a machine controller.

In some embodiments, a method of operating a meal production system includes determining a threshold distance between at least two meal receptacles and/or at least two meal receptacle holders positioned on a track. The threshold distance may be determined on the basis of a minimum distance for avoiding a collision between the meal receptacles and/or meal receptacle holders. Put another way, the threshold distance may be a collision distance. The method may also include moving a first meal receptacle along the track and moving a second meal receptacle along the track behind the first meal receptacle. The method may also include slowing the first meal receptacle at a position associated with a first meal ingredient dispenser positioned above the track. When the first meal receptacle is at the first position, the first meal ingredient dispenser may dispense a first meal ingredient into the first meal receptacle. The method may also include slowing the second meal receptacle behind the first meal receptacle. When the second meal receptacle is slowed, the second meal receptacle maybe kept at a distance greater than or equal to the threshold distance. The first meal receptacle may be moved after the first meal ingredient is dispensed into the first meal receptacle, and the second meal receptacle may be moved behind the first meal receptacle while the distance between the first meal receptacle and second meal receptacle are maintained. In this manner, the second meal receptacle may closely follow the first meal receptacle without colliding with the first meal receptacle.

In some embodiments, a method of operating a meal production system includes placing a first meal receptacle on a first meal receptacle holder of a track. In some embodiments, the first meal receptacle holder provides an opening through which an exterior portion of the first meal receptacle is physically accessible. The method may also include moving the first meal receptacle holder along the track and depositing at least one meal ingredient into the first meal receptacle. For example, at least one meal ingredient dispenser may dispense the at least one meal ingredient into the meal receptacle. The method may also include removing the first meal receptacle from the first meal receptacle holder by the exterior portion of the first meal receptacle. In some embodiments, removing the first meal receptacle may include lifting the first meal receptacle, where lifting the first meal receptacle may include contacting a bottom portion of the meal receptacle with a conveyor belt and moving the meal receptacle out of an open end of the first meal receptacle holder. In some embodiments, lifting the first meal receptacle may include contacting a bottom portion of the first meal receptacle with an extractor plate that is inclined relative to a direction of movement of the first meal receptacle holder along the track. In some embodiments, removing the first meal receptacle may include engaging exterior walls of the first meal receptacle with parallel rods configured to support the first meal receptacle. In such an embodiment, the first meal receptacle may not be lifted by the parallel rods, but the rods may hold the meal receptacle while the first meal receptacle holder disengages from the first meal receptacle.

As used herein, “dispensing” refers to depositing a solid, semi-solid, or liquid meal ingredient in a meal receptacle. “Dispensing” may also be referred to as “dropping” or “placing”, in some embodiments.

According to exemplary embodiments described herein, a meal production system may be configured to stop a meal receptacle holder at a position associated with a meal ingredient dispenser. However, in some embodiments, a meal production system may merely slow a meal receptacle holder at a position associated with a meal ingredient dispenser to allow the meal ingredient to be dispensed into a respective meal receptacle. That is, the meal receptacle holder may not fully stop at a position to receive a meal ingredient and may instead reduce speed by a desirable amount to provide enough time to for the meal ingredient to be dispensed into the respective meal receptacle. Accordingly, a meal receptacle holder may be located at a position along a track at which a meal ingredient dispenser may dispense a meal ingredient into a meal receptacle, where being located at the position includes the meal receptacle holder being stopped or slowly moving (forward, backwards, or otherwise) relative to the meal ingredient dispenser. Of course, a meal receptacle holder may be stopped or slowed to any appropriate speed by a meal production system, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a side schematic of one embodiment of a meal production system 100. According to the embodiment of FIG. 1, the meal production system is configured to produce a meal to order from a user. As shown in FIG. 1, the meal production system includes a meal receptacle dispenser 110. The meal receptacle dispenser includes an arm 112 and a meal receptacle hopper 114. The arm 112 is configured to move vertically to pick up and place a meal receptacle 200 in a meal receptacle holder 122. This functionality will be discussed further with reference to FIGS. 6A-6C. The meal receptacle hopper 114 contains a plurality of meal receptacles 200, which may be stacked. According to the embodiment of FIG. 1, the hopper 114 includes a biasing spring 116 which urges the plurality of stacked meal receptacles toward the arm 112. Such an arrangement may ensure that a meal receptacle that is closest to the arm 112 is in a consistent position to be picked up by the arm 112. In other embodiments, a meal receptacle dispenser may not include a biasing spring. In such an embodiment, the arm 112 may move a variable distance to pick up a meal receptacle 200 in the stack of meal receptacles. While in the embodiment of FIG. 1 the meal receptacles are held below the meal receptacle holder 122, in other embodiments the meal receptacles may be held above the meal receptacle holder 122, such that a meal receptacle may be dispensed and dropped into the meal receptacle holder without lifting by an arm 112 (for example, see FIG. 12). Any suitable arrangement for a meal receptacle dispenser may be employed, as the present disclosure is not so limited.

According to the embodiment of FIG. 1, the meal production system includes a track 120. The track 120 supports at least one meal receptacle holder 122, which is configured to move along the track. In particular, the track 120 is configured to move the meal receptacle holder forward or backward or stop the meal receptacle holder along the track. In the depicted embodiment, the track 120 is configured to move the meal receptacle holder independently relative to another meal receptacle holder that may be disposed along the track. In some embodiments, the track 120 may be a magnetic conveyor. As shown in FIG. 1, the meal receptacle holder 122 supports the meal receptacle 200 by a rim 202 of the meal receptacle. Accordingly, as will be discussed further with reference to FIGS. 2A-5C, a bottom portion of a meal receptacle held by the meal receptacle holder 122 may be physically accessible and not blocked by the meal receptacle holder. According to the embodiment of FIG. 1, the meal receptacle holder 122 is cantilevered from the track. In this manner, components of the track 120 are not in a dispensing path of any meal ingredient dispensers, and if meal ingredients were to be dispensed outside of the meal receptacle, the meal ingredients would not contact the track (an event which could potentially jam or damage the track). Of course, any suitable track configuration may be employed, including tracks positioned under the meal receptacle 200, as the present disclosure is not so limited. According to the embodiment of FIG. 1 the meal receptacle 200 is configured as a bowl. Of course, in other embodiments the meal receptacle may take other forms, such as a plate, tray, etc. as the present disclosure is not so limited.

As shown in FIG. 1, the meal production system includes an extractor plate 126 and an extraction actuator 124 configured as a conveyor belt that together form a meal receptacle lifter. The extractor plate 126 is configured to contact a bottom portion of the meal receptacle 200 when the meal receptacle holder 122 passes over the extractor plate. The extractor plate 126 of FIG. 1 is inclined relative to the track 120 which defines a path of the meal receptacle holder. In the specific embodiment of FIG. 1, the extractor plate is inclined relative to a horizontal plane, as the track 120 is parallel to the horizontal plane. The extractor plate is configured to lift the meal receptacle 200 at least partially out of the meal receptacle holder 122. In some embodiments, the extractor plate may be formed of a low-friction material such as polytetrafluoroethylene (PTFE) so that the meal receptacle may slide on the extractor plate. Of course, an extractor plate may be formed of any suitable material, as the present disclosure is not so limited. The extraction actuator is configured to engage the bottom portion of the meal receptacle to move the meal receptacle out of an open end of the meal receptacle holder 122. In the embodiment of FIG. 1, the extraction actuator is configured to move the meal receptacle out of the meal receptacle holder in a direction parallel to the direction of travel of the meal receptacle along the track 120. The extractor plate 126 guides the meal receptacle 200 onto the extraction actuator 124. In some embodiments the extraction actuator 124 may include a ramped portion that is inclined relative to the track. In such an embodiment, the extractor plate 126 may be omitted, as the ramped extraction actuator may perform the same function of lifting the meal receptacle from the bottom portion of the meal receptacle. As would be apparent to one of skill in the art, an extractor plate and extraction actuator may be arranged in any suitable configuration, to lift and remove the meal receptacle from the meal receptacle holder, as the present disclosure is not so limited.

It should be noted that while the meal production system of FIG. 1 includes an extraction actuator 124 configured as a conveyor belt, other arrangements are contemplated for an extraction actuator. For example, in some embodiments an extraction actuator of a meal receptacle lifter may be configured as a second track including a second meal receptacle holder configured to extract a meal receptacle from the meal receptacle holder 122 of the track 120. As would be apparent to one of skill in the art, any suitable arrangement may be employed to move a meal receptacle out of the meal receptacle holder 122, as the present disclosure is not so limited.

According to the embodiment of FIG. 1, the meal production system also includes a first meal ingredient dispenser 130 and a second meal ingredient dispenser 134. Each of the two meal ingredient dispensers is configured to dispense a meal ingredient into the meal receptacle 200. According to the embodiment of FIG. 1, the first meal ingredient dispenser is a solid meal ingredient dispenser, whereas the second meal ingredient dispenser is a liquid meal ingredient dispenser. As shown in FIG. 1, the first meal ingredient dispenser includes a paddle 132 configured to rotate to dispense food contained inside of the first meal dispenser into the meal receptacle 200. In the embodiment of FIG. 1, the second meal ingredient dispenser 134 includes a first nozzle 136. The first nozzle may include a valve (e.g., a solenoid valve) configured to control flow of a liquid meal ingredient contained in the fourth meal ingredient dispenser. For example, the valve may be configured to move between a closed position where liquid is not able to flow out of the second meal ingredient dispenser 134 and an open position where liquid is able to flow out of the second meal ingredient dispenser. In some embodiments a liquid contained in the second meal ingredient dispenser may be driven from the nozzle 136 by way of gravity. In other embodiments, a pump may be employed to assist in driving the fluid from the nozzle 136. Any suitable dispensing arrangement may be employed for a solid or liquid meal ingredient dispenser, as the present disclosure is not so limited.

According to the embodiment of FIG. 1, the meal production system 100 is controlled by a machine controller 140, which may include one or more processors configured to execute computer readable instructions stored in volatile or non-volatile memory. As shown in FIG. 1, the machine controller is connected to each of the first meal ingredient dispenser 130 and the second meal ingredient dispenser 134. The machine controller may coordinate the dispensing of meal ingredients from one or more dispensers. For example, the machine controller may command the first dispenser 130 to rotate a paddle 132 to dispense a meal ingredient from the first meal ingredient dispenser. As another example, the machine controller may command the second meal ingredient dispenser 134 to move a valve in the nozzle 136 to an open position to dispense a second meal ingredient. The machine controller 140 is also connected to the track 120 and is configured to control the position, velocity, and acceleration of the at least one meal receptacle holder 122. The machine controller may coordinate the motion of multiple meal receptacle holders to avoid collisions between the meal receptacles and/or meal receptacle holders. In some embodiments, the machine controller may coordinate motion of the meal receptacle holder 122 based at least partly on an order received from a user, who may input the order at one or more user input devices.

Although the meal production system illustrated in FIG. 1 includes one solid meal ingredient dispenser 130 and one liquid meal ingredient dispenser 134, it should be noted that any suitable number of meal ingredient dispensers may be employed with the meal production system 100. That is, a meal production system may include any number of solid or semi-solid meal ingredient dispensers that may dispense, cold, hot, or room temperature ingredients into a meal receptacle. Likewise, a meal production system may include any number of liquid meal ingredient dispensers that dispense cold, hot, or room temperature liquid ingredients into a meal receptacle.

Figure 2A:
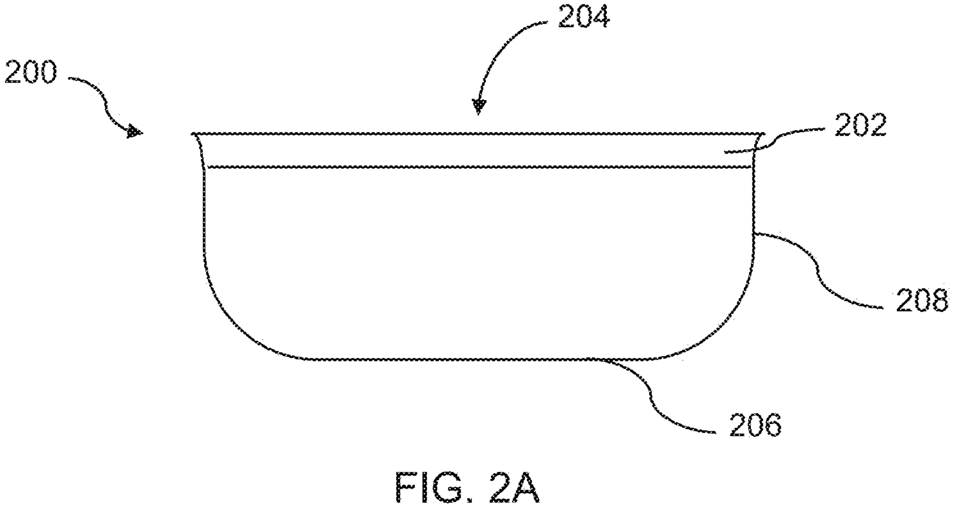
FIG. 2A is a side schematic of one embodiment of a meal receptacle.
Figure 2B:
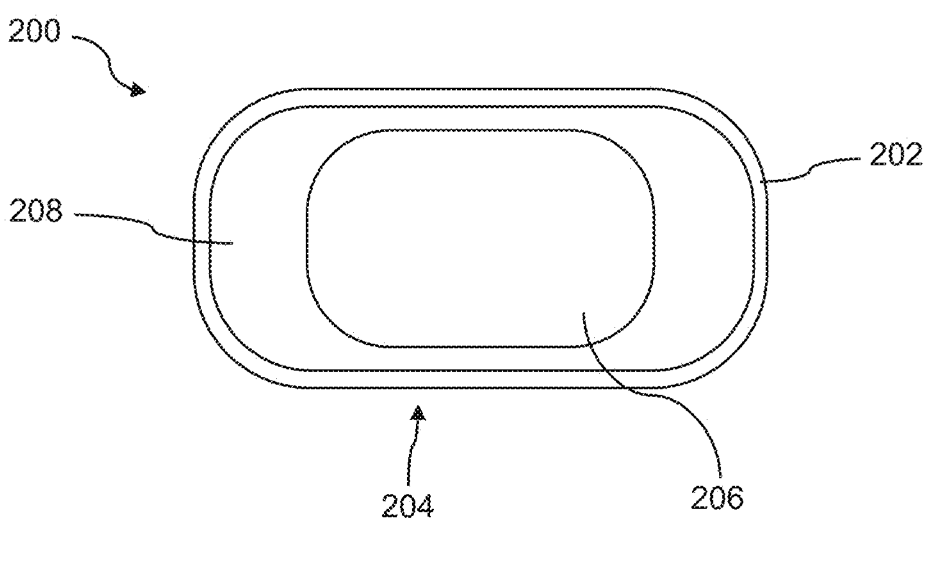
FIG. 2B is a top schematic of the meal receptacle of FIG. 2A.

FIG. 2A is side schematic and FIG. 2B is a top schematic of one embodiment of a meal receptacle 200. According to the embodiment of FIGS. 2A-2B, the meal receptacle 200 is configured as a bowl. The meal receptacle includes a rim 202 that, in some embodiments, may be used by a meal receptacle holder to hold the bowl in a meal production system. As shown in FIGS. 2A-2B, the meal receptacle includes an opening 204 to an internal volume through which meal ingredients are received. The opening 204 is defined by the rim 202, which extends around a perimeter of the opening 204. As shown in FIGS. 2A-2B, the meal receptacle also includes bottom portion 206 and side walls 208. The bottom portion 206 of the depicted embodiment is formed as a flat base. The side walls 208 taper up from the flat base and flare out to form the rim 202. The meal receptacle 200 may be formed of any suitable material that may contain food, as the present disclosure is not so limited.

Figure 3A:
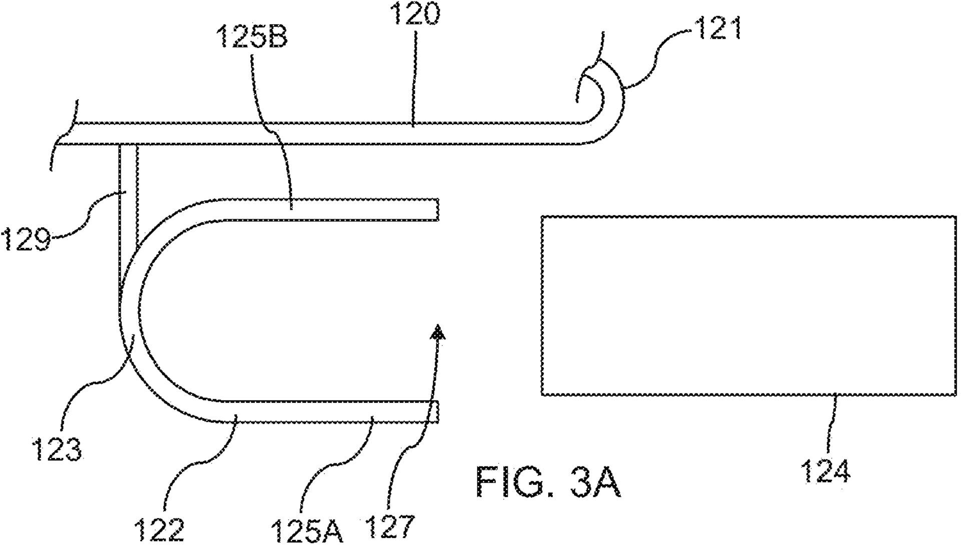
FIG. 3A is a top schematic of one embodiment of a track of a meal production system.

FIG. 3A is a top schematic of one embodiment of a track 120 of a meal production system. As shown in FIG. 3A, the track 120 supports and moves a meal receptacle holder 122 along the track. According to the embodiment of FIG. 3A, the track is configured as a continuous loop, where the meal receptacle holders may move continuously in a single direction along the track, if desired. As shown in FIG. 3A, the track includes a return curve 121 by which the meal receptacle holder 122 changes direction to return to a start of the track. The track 120 of FIG. 3A may be a magnetic conveyor, which moves the meal receptacle holder 122 independently from any other meal receptacle holder on the track.

Figure 3B:
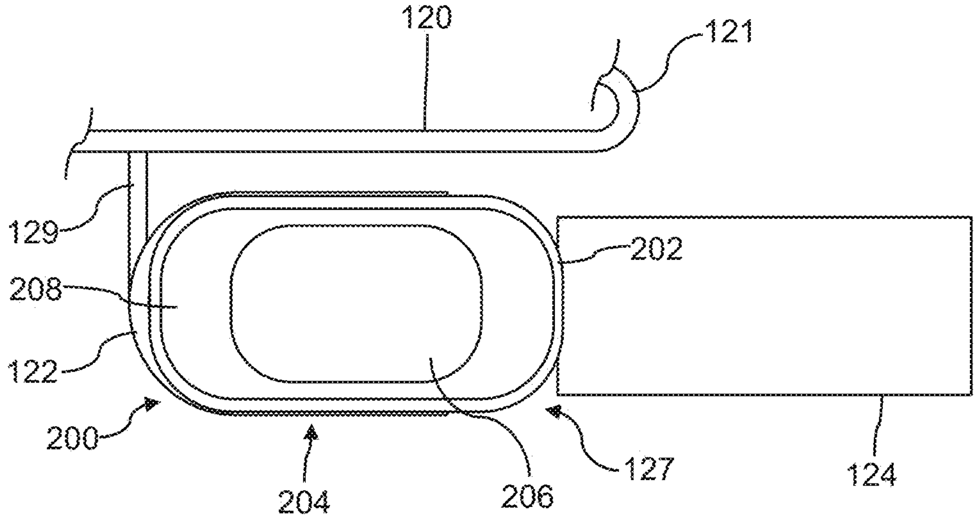
FIG. 3B is a top schematic of the track of FIG. 3A in first state.
Figures 3C, 3D:
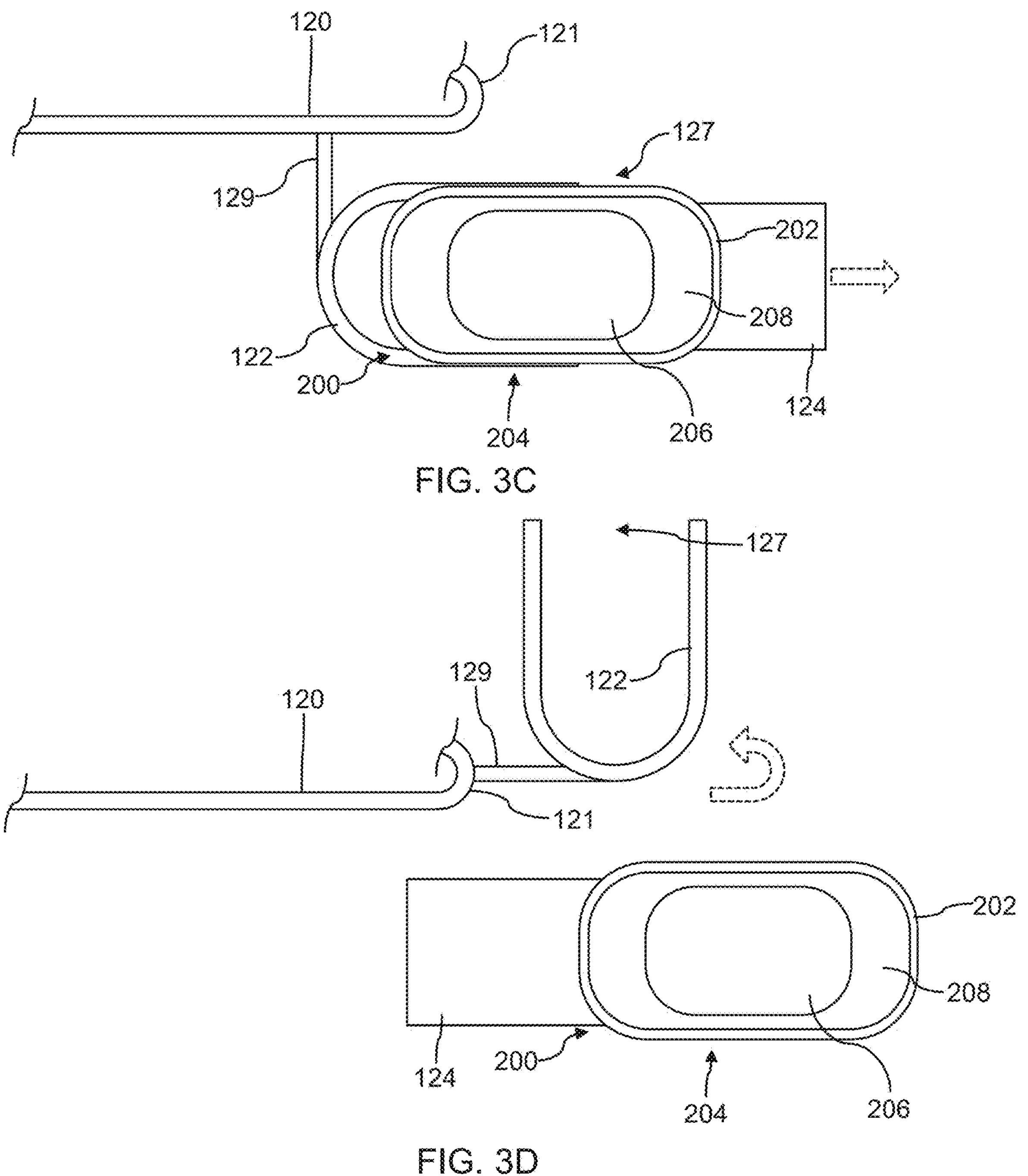
FIG. 3C is a top schematic of the track of FIG. 3A in a second state.
FIG. 3D is a top schematic of the track of FIG. 3A in a third state.

According to the embodiment of FIG. 3A, the meal receptacle holder 122 is configured in a U-shape and is configured to support three sides of a meal receptacle (for example, see FIG. 3B. More specifically, as shown in FIG. 3A, the meal receptacle holder includes a back span 123 connected to a first leg 125A and a second leg 125B. The meal receptacle holder includes an open end 127 between the first leg 125A and the second leg 125B. The meal receptacle holder of FIG. 3A is configured to move in a direction of the open end 127. That is, the open end 127 may define a forward direction and the back span 123 may define a rearward direction. Accordingly, the back span 123 may be configured to support a rear portion of a meal receptacle, while the first leg and second leg support two side portions of a meal receptacle. The meal receptacle holder may be configured to support a meal receptacle holder by the rim or walls of the meal receptacle, such that a bottom portion of the meal receptacle is physically accessible to a meal receptacle lifter. The meal receptacle holder may accordingly have a shape corresponding to the shape of the meal receptacle rims and/or walls. As shown in FIG. 3C the meal receptacle holder 122 is cantilevered from the track 120 by a support 129. While the meal receptacle holder 122 of FIG. 3C, includes a single support, in other embodiments a meal receptacle holder may include two or more supports, as the present disclosure is not so limited.

According to the embodiment of FIG. 3A, the meal receptacle holder engages a meal receptacle on three sides, and the meal receptacle holder may correspondingly resist movement of the meal receptacle in these directions (e.g., the rear and side directions). However, as the meal receptacle holder includes the open end 127, a meal receptacle may be extracted from the meal receptacle holder 122 via the open end, as will be discussed further with reference to FIGS. 3B-3D. In some embodiments, the meal receptacle holder may resist movement in a direction of the open end 127. In some embodiments, the meal receptacle holder may apply a friction force to a meal receptacle held by the meal receptacle holder, such that the meal receptacle is not removable via the open end 127 until a threshold force is applied to the meal receptacle in the direction of the open end. In other embodiments, the meal receptacle may at least partially engage a front portion of a meal receptacle, such that when the meal receptacle is received in the meal receptacle holder the meal receptacle is not removeable from the open end 127. However, the open end 127 may be sized and shaped such that once the meal receptacle is at least partially lifted out of the meal receptacle holder, the meal receptacle may be removed from the meal receptacle holder via the open end. Of course, any suitable arrangement for the open of the meal receptacle holder may be employed, as the present disclosure is not so limited. Additionally, in some embodiments a meal receptacle holder may engage a single side of a meal receptacle, two sides of a meal receptacle, have multiple engagement regions on a single side of a meal receptacle, or any engage any suitable number of surfaces of a meal receptacle holder to move a meal receptacle along a track, as the present disclosure is not so limited.

According to the embodiment of FIG. 3A, the meal production system also includes a meal receptacle lifter including an extraction actuator 124 configured in this embodiment as a conveyor belt. The extraction actuator is positioned below the meal receptacle holder 122 and is aligned with the open end 127 of the meal receptacle holder

122. The extraction actuator 124 is configured to apply force to a meal receptacle held in the meal receptacle holder in a direction of the open end 127 so that the meal receptacle may be removed from the meal receptacle holder. In particular, the extraction actuator is configured to engage a bottom portion of the meal receptacle to apply the force to the meal receptacle. Additionally, in some embodiments, the extraction actuator 124 is configured to lift a meal receptacle at least partially out of the meal receptacle holder 122. According to this embodiment, the lifting of the meal receptacle may free the meal receptacle to be removed by the extraction actuator 124 via the open end 127.

FIGS. 3B-3D depict various states of the track 120 and extraction actuator 124 of FIG. 3A as a meal receptacle 200 is removed from the meal receptacle holder 122. As shown in FIG. 3B, the meal receptacle of FIG. 2B is disposed in the meal receptacle holder 122. As discussed previously, the meal receptacle is supported by a rim 202 of the meal receptacle. The meal receptacle holder 122 also engages side walls 208 of the meal receptacle to secure the meal receptacle within the meal receptacle holder. Accordingly, a bottom portion 206 is physically accessible so that the meal receptacle may be engaged by the meal receptacle lifter (e.g., extraction actuator 124). In the state shown in FIG. 3B, the meal receptacle holder 122 is positioned along the track 120 such that the bottom portion 206 of the meal receptacle is not in contact with the extraction actuator.

In the state shown in FIG. 3C, the meal receptacle holder 122 has been advanced along the track 120. In particular, the meal receptacle holder was advanced until the bottom portion 206 of the meal receptacle 200 contacted the extraction actuator 124. As noted previously, the extraction actuator 124 is configured to apply a force in a direction of the open end 127 of the meal receptacle holder. In some embodiments, the extraction actuator may be configured to apply a force in a direction of motion of the meal receptacle holder 122 along the track 120. Accordingly, as shown by the dashed arrow, the extraction actuator applies a force to the bottom portion 206 of the meal receptacle 200 to remove the meal receptacle from the meal receptacle holder 122 via the open end 127. In some embodiments, the extraction actuator 124 and/or an extractor plate may at least partially lift the meal receptacle 200 relative to the meal receptacle holder. By lifting the meal receptacle, the extraction actuator may disengage the rim 202 and the meal receptacle holder 122 so that the meal receptacle may be moved out of the open end 127. Of course, in other embodiments the extraction actuator may apply a force greater than or equal to a threshold force to the meal receptacle to remove the meal receptacle from the meal receptacle holder via the open end 127. In some embodiments, the meal receptacle holder 122 may stop on the track 120 while the meal receptacle 200 is removed from the meal receptacle holder as shown in FIG. 3C. By stopping, the meal receptacle holder 122 may allow sufficient time for the extraction actuator 124 to move the meal receptacle 200 to a position where the meal receptacle is clear of the path of the meal receptacle holder. In other embodiments, the extraction actuator 124 may be configured to move the meal receptacle 200 faster than the meal receptacle holder 122. In such an arrangement, the difference in speed of the extraction actuator 124 and the meal receptacle holder may be such that the extraction actuator 124 is able to move the meal receptacle out of the path of the meal receptacle holder 122 before the meal receptacle holder and meal receptacle collide. As shown in FIG. 3D, once the meal receptacle 200 is outside of a range of motion of the meal receptacle holder, the meal receptacle holder 122 may continue along the track 120 and return curve 121 to move back to the start of the track 120.

Figures 4A, 4B:
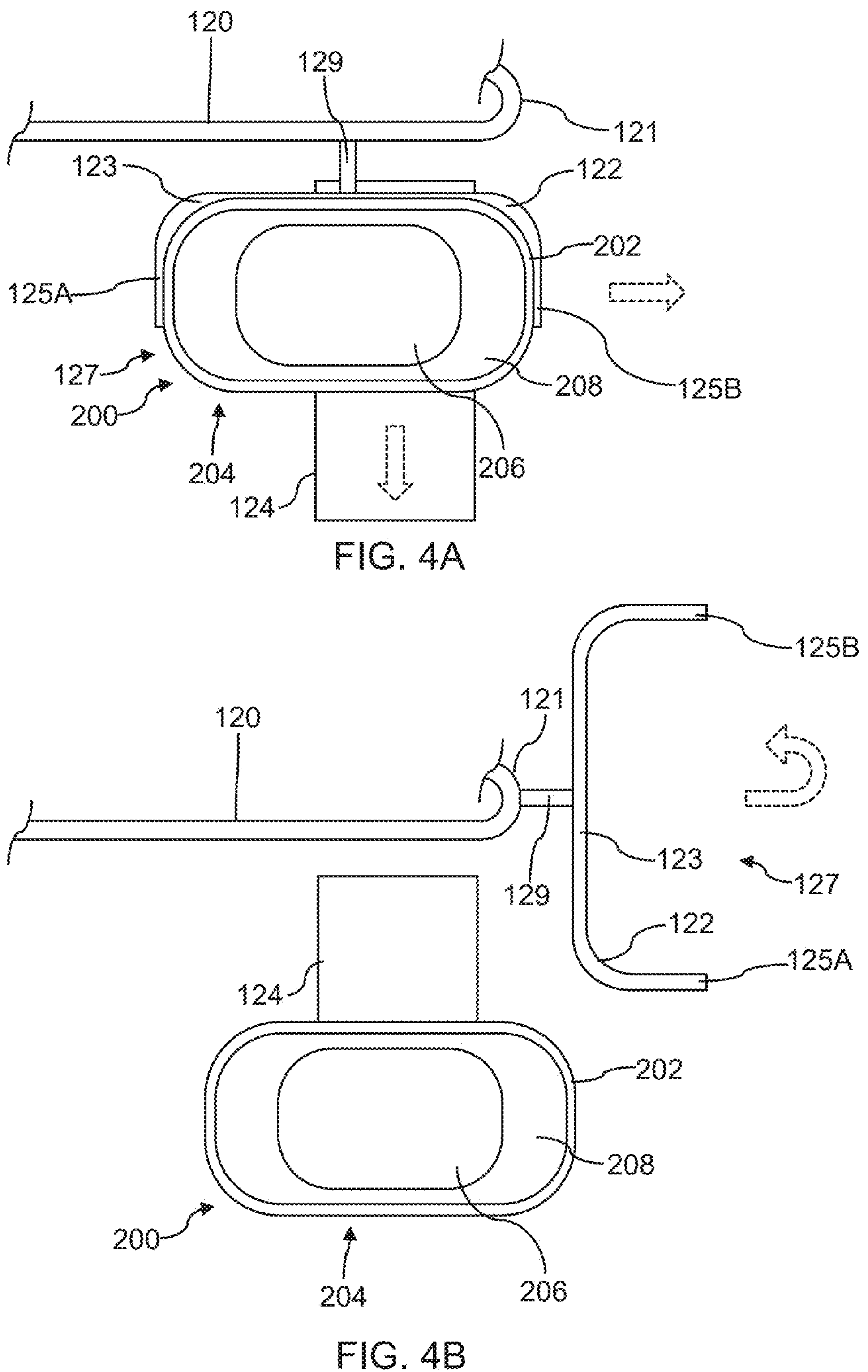
FIG. 4A is a top schematic of another embodiment of a track of a meal production system in a first state.
FIG. 4B is a top schematic of the track of FIG. 4A in a second state.

FIGS. 4A-4B are top schematics of another embodiment of a track 120 of a meal production system in two different states. As shown in FIG. 4A, the configuration of the track 120 is similar to that of FIGS. 3A-3D. That is, the track 120 includes a return curve 121 and a meal receptacle holder 122 configured to move along the track 120. As shown in FIG. 4A, the meal receptacle holder 122 is configured in a U-shape like the meal receptacle holder of FIGS. 3A-3D. However, in contrast to that embodiment, the meal receptacle holder 122 includes an open end 127 oriented perpendicular to a direction of movement of the meal receptacle holder along the track 120. As shown in FIG. 4A, the meal receptacle holder includes a back span 123 supporting a first leg 125A and a second leg 125B. The first leg 125A is configured to support a rear portion of a meal receptacle 200, and the second leg 125B is configured to support a front portion of the meal receptacle. The back span 123 supports a side portion of the meal receptacle 200, with the other side portion of the meal receptacle being adjacent an open end 127 of the meal receptacle holder. A support 129 cantilevers the back span 123 and legs 125A, 125B from the track 120. As in the embodiment of FIGS. 3A-3D, the meal receptacle holder 122 supports the meal receptacle 200 along a rim 202 of the meal receptacle, and the meal receptacle holder also engages side walls 208. Accordingly, a bottom portion 206 of the meal receptacle is physically accessible so that the meal receptacle 200 may be removed from the meal receptacle holder 122 by applying force to the bottom portion.

According to the embodiment of FIGS. 4A-4B, the meal production system includes a meal receptacle lifter having an extraction actuator 124. In contrast to the embodiment of FIGS. 3A-3D, the extraction actuator 124 is configured to apply a force to the meal receptacle 200 in a direction perpendicular to a direction of movement of the meal receptacle holder 122 along the track 120. Accordingly, the extraction actuator 124 is configured to apply a force to the bottom portion 206 of the meal receptacle in a direction parallel to the open end 127 of the meal receptacle holder, so that the meal receptacle may be moved out of the open end by the extraction actuator. In the state shown in FIG. 4A, the extraction actuator 124 is in contact with the bottom portion 206 of the meal receptacle 200. Accordingly, the extraction actuator applies a force to the meal receptacle 200 in a direction perpendicular to the direction of movement of the meal receptacle holder 122 along the track. As the force is applied to remove the meal receptacle 200 from the meal receptacle holder 122, the meal receptacle is moved out of the open end 127 along the extraction actuator 124. In the embodiment of FIG. 4A, the meal receptacle holder 122 may continue to move along the track 120 as the meal receptacle 200 is removed from the meal receptacle holder 122. Of course, in other embodiments the meal receptacle holder may stop as the meal receptacle is removed by the extraction actuator, as the present disclosure is not so limited.

As shown in FIG. 4B and similar to the embodiment of FIGS. 3A-3D, the extraction actuator 124 and the meal receptacle holder 122 are configured such that the extraction actuator 124 moves the meal receptacle 200 to clear the meal receptacle holder before the meal receptacle holder travels around the return curve 121. That is, the meal receptacle is moved away from the track 120 to a sufficient extent so that the meal receptacle holder 122 does not collide with the meal receptacle 200 as it continues along the track 120. It should be noted that while one embodiment of a return curve 121 and an extraction actuator 124 are shown in FIGS.

4A-4B, the track 120 may take any suitable shape to avoid collision between a removed meal receptacle 200 and a meal receptacle holder, as the present disclosure is not so limited.

It should be noted that while in the embodiment of FIGS. 4A-4B the extraction actuator 124 is oriented perpendicular to the direction of movement of the meal receptacle holder 122 on the track 120, an extraction actuator may be angled in any suitable direction relative to a track 120 of the meal production system. That is, the extraction actuator may be angled in any direction relative to a path of travel of a meal receptacle holder 122. The meal receptacle holder 122 may have an open end oriented in a direction parallel to the direction of the extraction actuator, so that the extraction actuator may remove a meal receptacle from the meal receptacle holder.

Figure 5A:
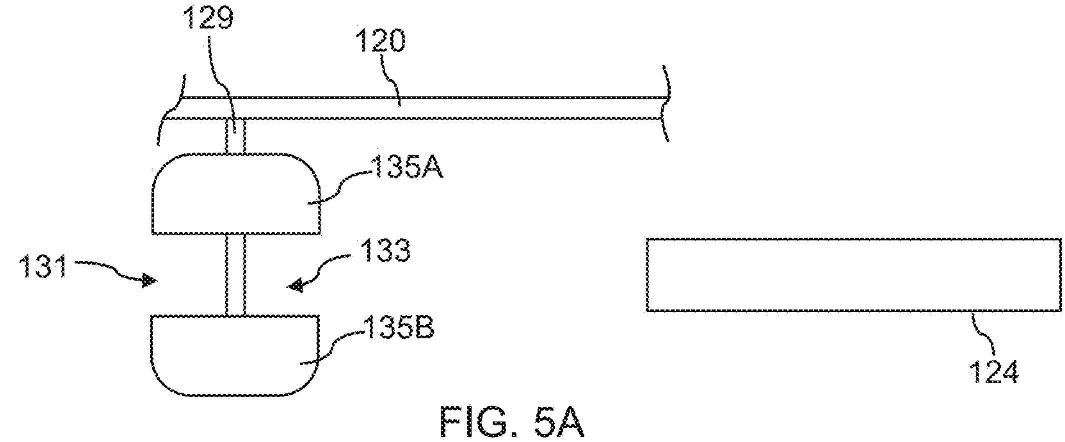
FIG. 5A is a top schematic of another embodiment of a track of a meal production system.

FIG. 5A is a top schematic of another embodiment of a track 120 of a meal production system. According to the embodiment of FIG. 5A, the track 120 includes a meal receptacle holder 131 configured to support a meal receptacle by a bottom portion of the meal receptacle. The meal receptacle holder includes a first base portion 135A and a second base portion 135B supported by a cantilevered support 129 and separated by a channel 133. The first base portion 135A and the second base portion 135B are configured to support a bottom portion of the meal receptacle. For example, as shown in the top schematic of FIG. 5B, the first base portion 135A and second base portion 135B support a first region of a bottom portion 206 of the meal receptacle. The channel 133 is configured to allow an extraction actuator 124 to pass through and engage the bottom portion of the meal receptacle, as will be discussed further with reference to FIG. 5C. That is, the channel 133 allows a second region of the bottom portion 206 of the meal receptacle to remain physically accessible to the extraction actuator 124.

Figure 5B:
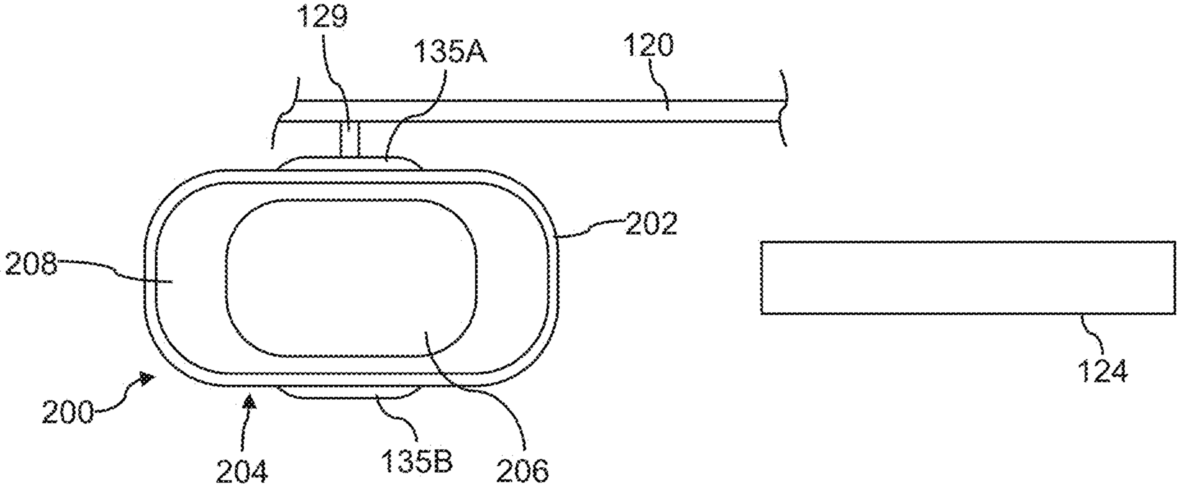
FIG. 5B is a top schematic of the track of FIG. 5A in use with one embodiment of a meal receptacle.
Figure 5C:
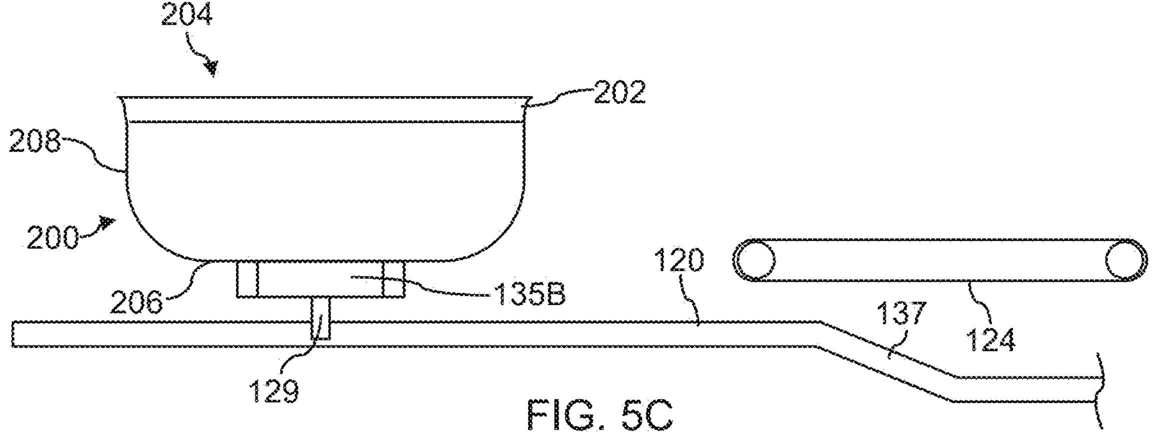
FIG. 5C is a side schematic of the track and meal receptacle of FIG. 5B.

FIG. 5C is a side schematic of the track 120 and the meal receptacle 200 of FIGS. 5A-5B showing the arrangement of the meal receptacle holder and extraction actuator 124. As shown in FIG. 5C, the meal receptacle 200 is supported by the bottom portion 206 of the meal receptacle. The channel formed in the meal receptacle holder (for example, see FIG. 5A), is aligned with the extraction actuator 124 and is configured to receive the extraction actuator. The extraction actuator is configured to engage the bottom portion 206 of the meal receptacle as the extraction actuator passes through the channel. According to the embodiment of FIG. 5C, the extraction actuator 124 is configured to lift the meal receptacle when the meal receptacle engages the extraction actuator. As shown in FIG. 5C, the extraction actuator 124 is higher than the first base portion and second base portion 135B, and when the meal receptacle contacts the extraction actuator the conveyor accordingly lifts the meal receptacle 200 off of the first base portion and second base portion. In the embodiment of FIG. 5C, the track includes a decline 137 configured to allow the meal receptacle holder to clear the extraction actuator once the meal receptacle is lifted from the meal receptacle holder. Once the meal receptacle holder is clear of the extraction actuator, the meal receptacle holder may return to a start of the track 120 (e.g., via return curve).

Figure 6A:
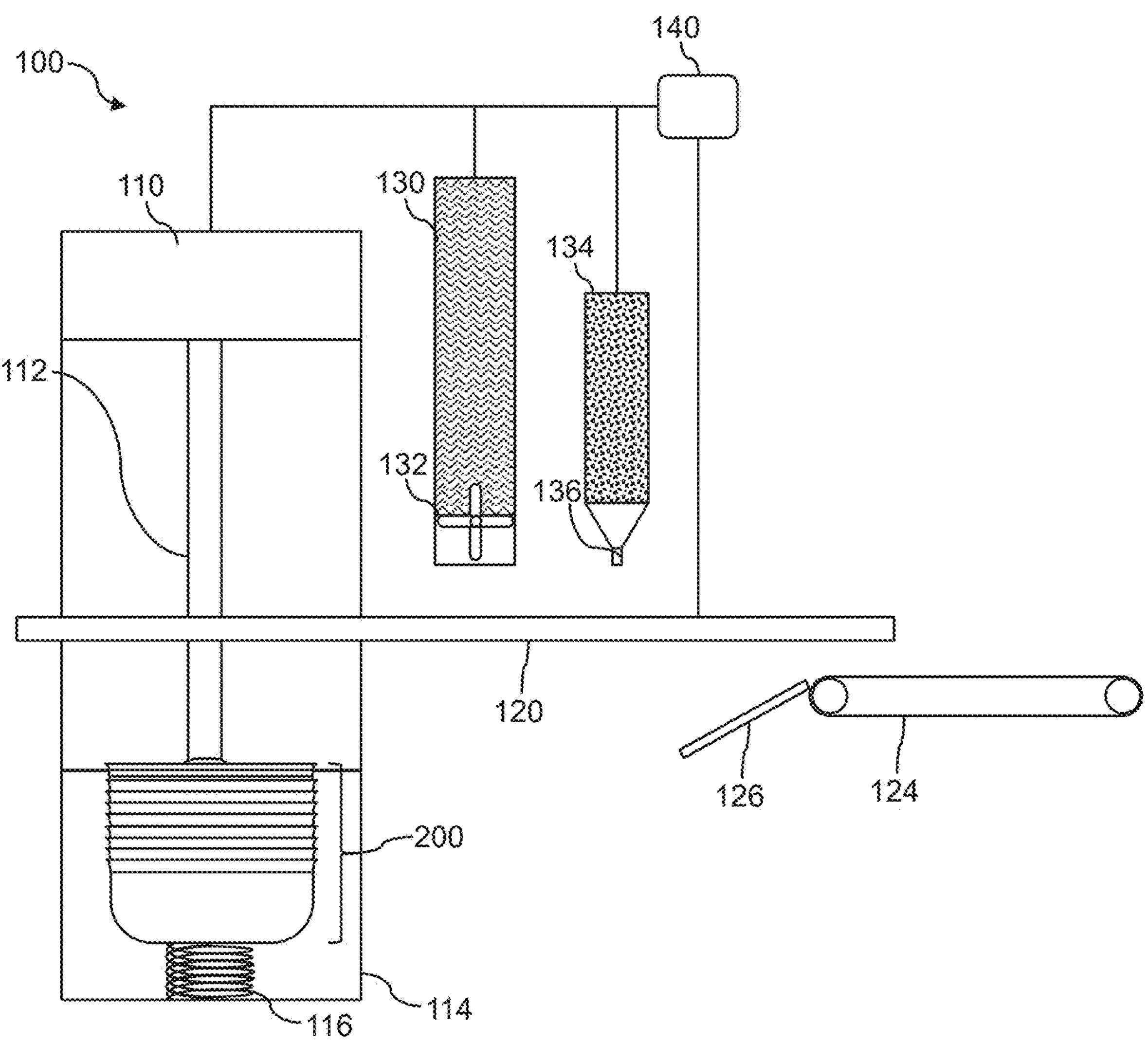
FIG. 6A is a side schematic of the meal production system of FIG. 1 in a first state.

FIGS. 6A-6F are side schematics of the meal production system 100 of FIG. 1 as the meal production system goes through states of a meal production process. According to the embodiment of FIGS. 6A-6F, the motion of the various elements of the meal production system may be controlled by the machine controller 140. In FIG. 6A, the meal production system is in a starting state. Accordingly, no meal receptacles 200 are on the track 120. As shown in FIG. 6A, the arm 112 of the meal receptacle dispenser 110 has extended into the meal receptacle hopper 114. The arm may engage the bottom portion of the uppermost meal receptacle (e.g., the meal receptacle closest to the arm 112) so that the arm may lift the uppermost meal receptacle from the stack of meal receptacles 200. In some embodiments, the arm may include a suction cup configured to make a vacuum or low-pressure seal with the bottom portion of the uppermost meal receptacle. According to this embodiment, the suction cup may engage the bottommost portion of the uppermost meal receptacle and then the pressure inside of an inner volume of the suction cup may be lowered (e.g., with a pump). Accordingly, the suction cup may form a seal with the bottom portion of the uppermost meal receptacle such that the arm 112 may lift the uppermost meal receptacle from the stack of meal receptacles 200. As the uppermost meal receptacle is lifted, the track 120 may be controlled so that no meal receptacle holders impede the path of the uppermost meal receptacle as the uppermost meal receptacle is lifted by the arm 112.

Figure 6B:
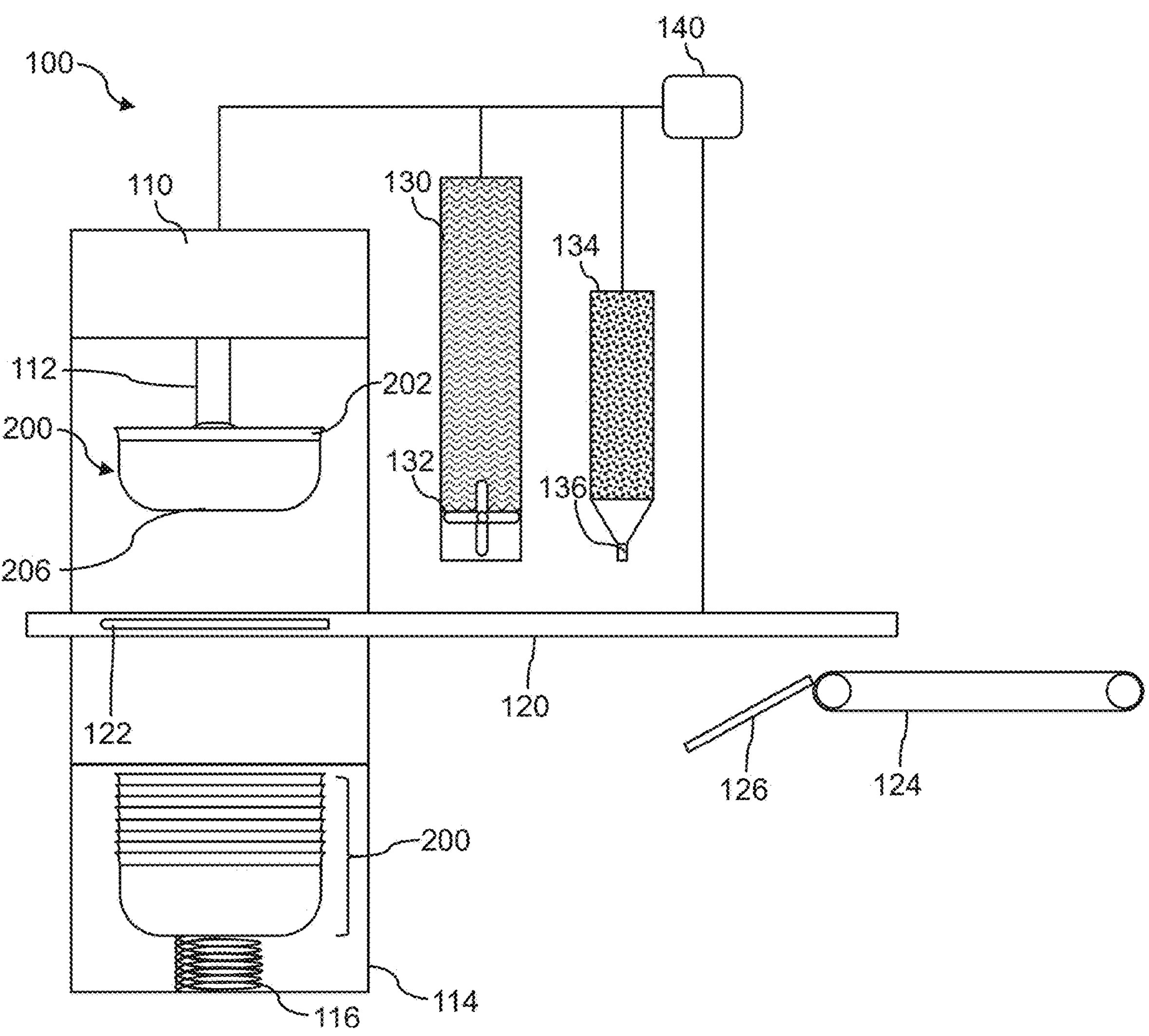
FIG. 6B is a side schematic of the meal production system of FIG. 1 in a second state.

FIG. 6B is a side schematic of the meal production system 100 of FIG. 1 in a second state. As shown in FIG. 6B, the arm 112 has lifted the uppermost meal receptacle 200 from the hopper 114. In particular, the uppermost meal receptacle has been lifted above the track 120. As shown in FIG. 6B, once the uppermost meal receptacle is removed, the biasing spring 116 urges the stack of meal receptacles in the hopper upwards so that the next meal receptacle is in position to be picked up by the arm 112 of the meal receptacle dispenser 110. As shown in FIG. 6B, once the meal receptacle 200 held by the arm 112 is positioned above the track, a meal receptacle holder 122 may be moved along the track 120 to a position aligned with the arm. Accordingly, the meal receptacle holder 122 is in a position to receive the meal receptacle 200 when released by the arm 112. In some embodiments, the arm may release the meal receptacle to freely fall into the meal receptacle holder 122. In other embodiments, the arm 112 may place the meal receptacle in the meal receptacle holder before the meal receptacle is released. Of course, any suitable arrangement for placing the meal receptacle on the meal receptacle holder may be employed, as the present disclosure is not so limited. To release the meal receptacle, in some embodiments the arm may pressurize the suction cup holding the bottom portion 206 of the meal receptacle. In some embodiments the arm may allow the section cup to equalize in pressure with environmental pressure to release the meal receptacle.

It should be noted that while the arm 112 of the meal receptacle dispenser 110 of FIGS. 6A-6B includes a suction cup, any suitable arrangement for picking up meal receptacles from a meal receptacle hopper may be employed, as the present disclosure is not so limited. For example, in some embodiments the arm 112 may include graspers configured to engage the rim 202 of an uppermost meal receptacle. In other embodiments, the arm 112 may include graspers configured to engage inner walls of an uppermost meal receptacle.

Figure 6C:
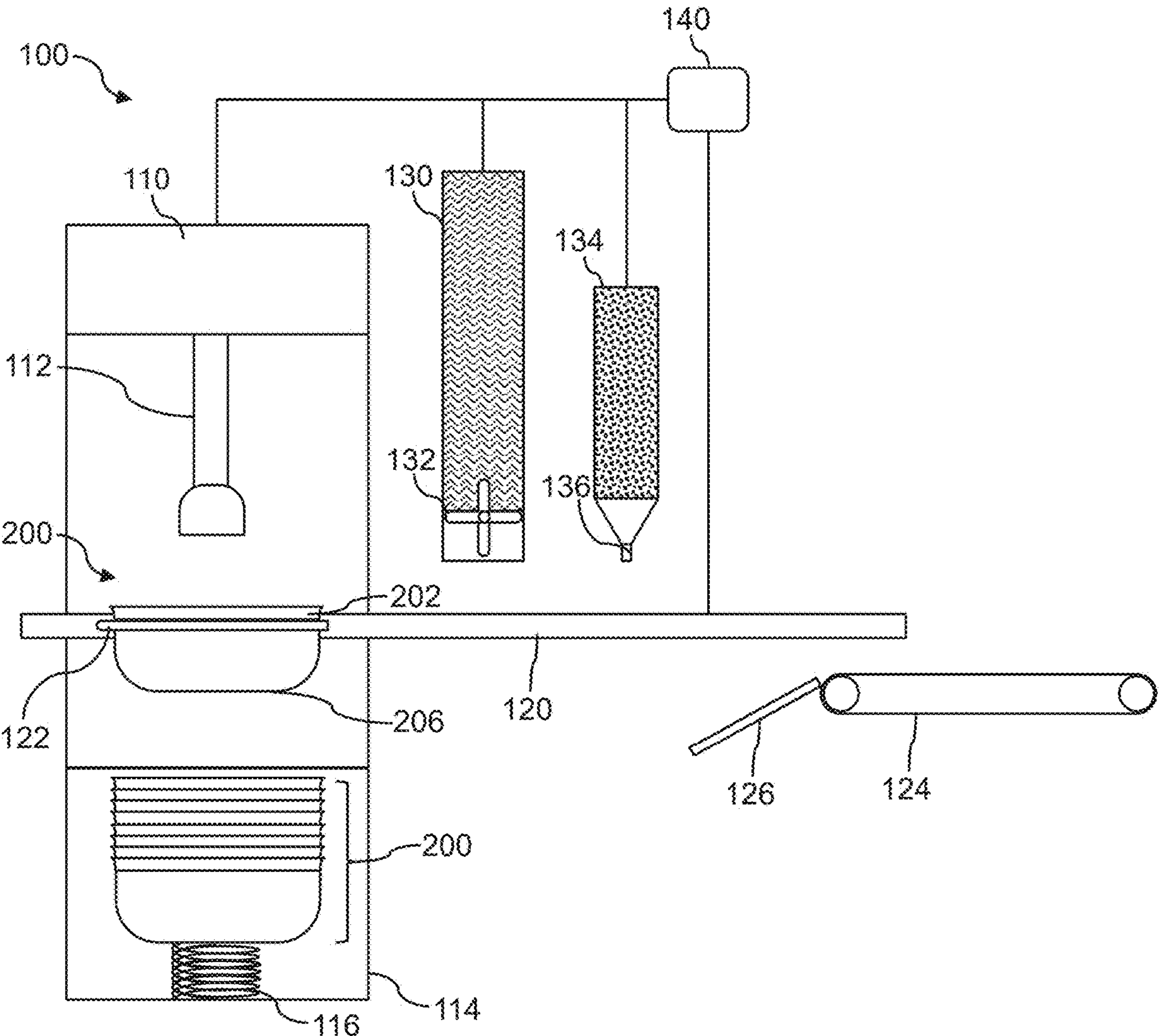
FIG. 6C is a side schematic of the meal production system of FIG. 1 in a third state.

FIG. 6C is a side schematic of the meal production system 100 of FIG. 1 in a third state. As shown in FIG. 6C, the arm 112 has released the held meal receptacle 200 onto the meal receptacle holder 122. As discussed previously in reference to other embodiments, the meal receptacle holder 122 is configured engage the rim 202 of the meal receptacle so that the bottom portion 206 of the meal receptacle is physically accessible. In some embodiments, the process shown between FIGS. 6A and 6C may be initiated by the submission of an order by a user. That is, a meal receptacle may not be placed on the track 120 until an order is received.

Figure 6D:
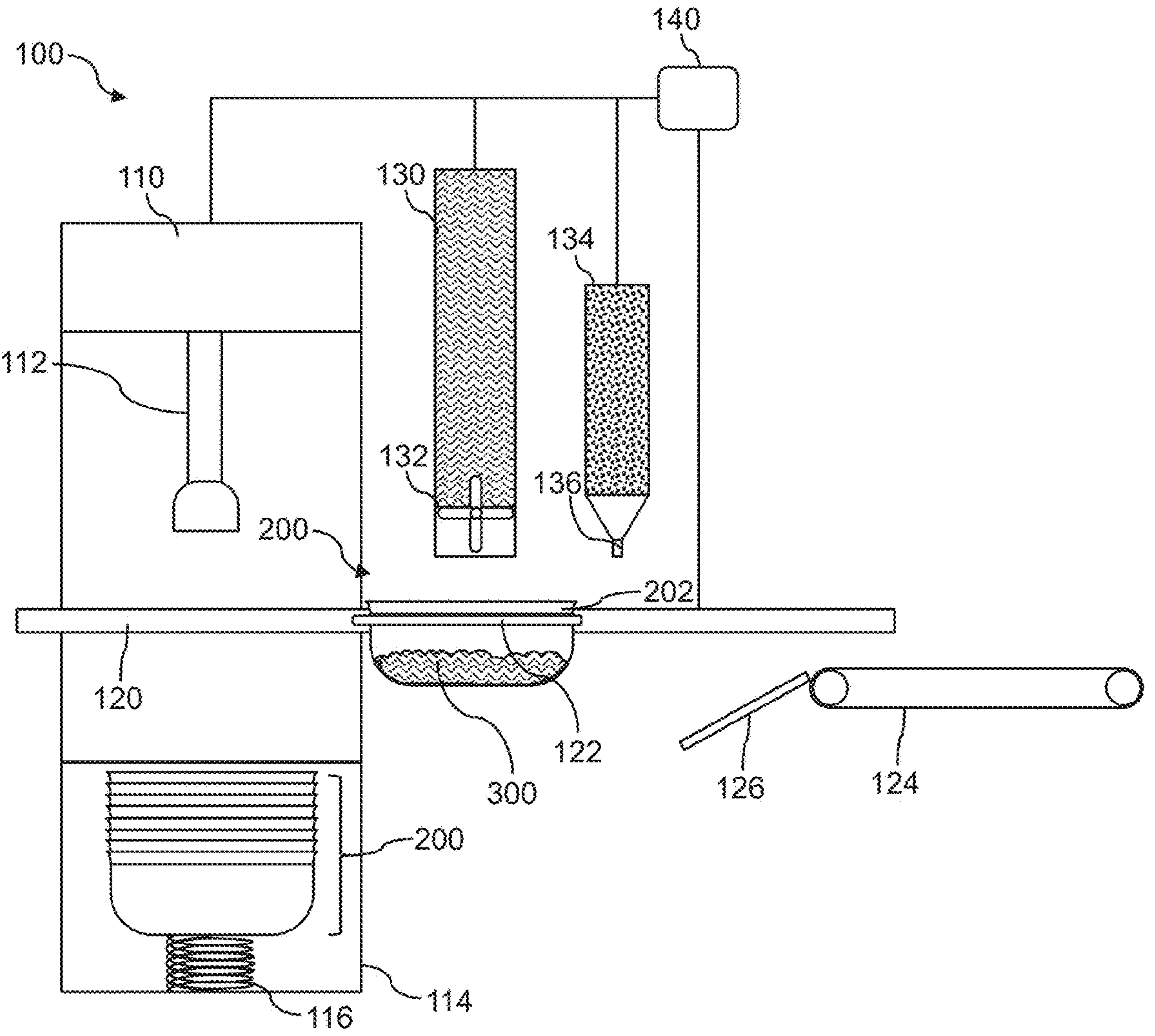
FIG. 6D is a side schematic of the meal production system of FIG. 1 in a fourth state.

FIG. 6D is a side schematic of the meal production system 100 of FIG. 1 in a fourth state. As shown in FIG. 6D, the meal receptacle 200 in the meal receptacle holder 122 has been moved along the track 120 to a position associated with the first meal ingredient dispenser 130. That is, the meal receptacle 200 is positioned underneath the first meal ingredient dispenser. As shown in FIG. 6D, the paddle 132 of the first meal ingredient dispenser has been rotated to dispense a first meal ingredient 300 into the meal receptacle 200. In some embodiments, the meal receptacle holder 122 may stop in the position shown in FIG. 6D while the first meal ingredient 300 is dispensed into the meal receptacle 200. In other embodiments, the meal receptacle holder 122 may be slowed or otherwise moved at a speed suitable for the first meal ingredient dispenser 130 to dispense the first meal ingredient into the meal receptacle.

Figure 6E:
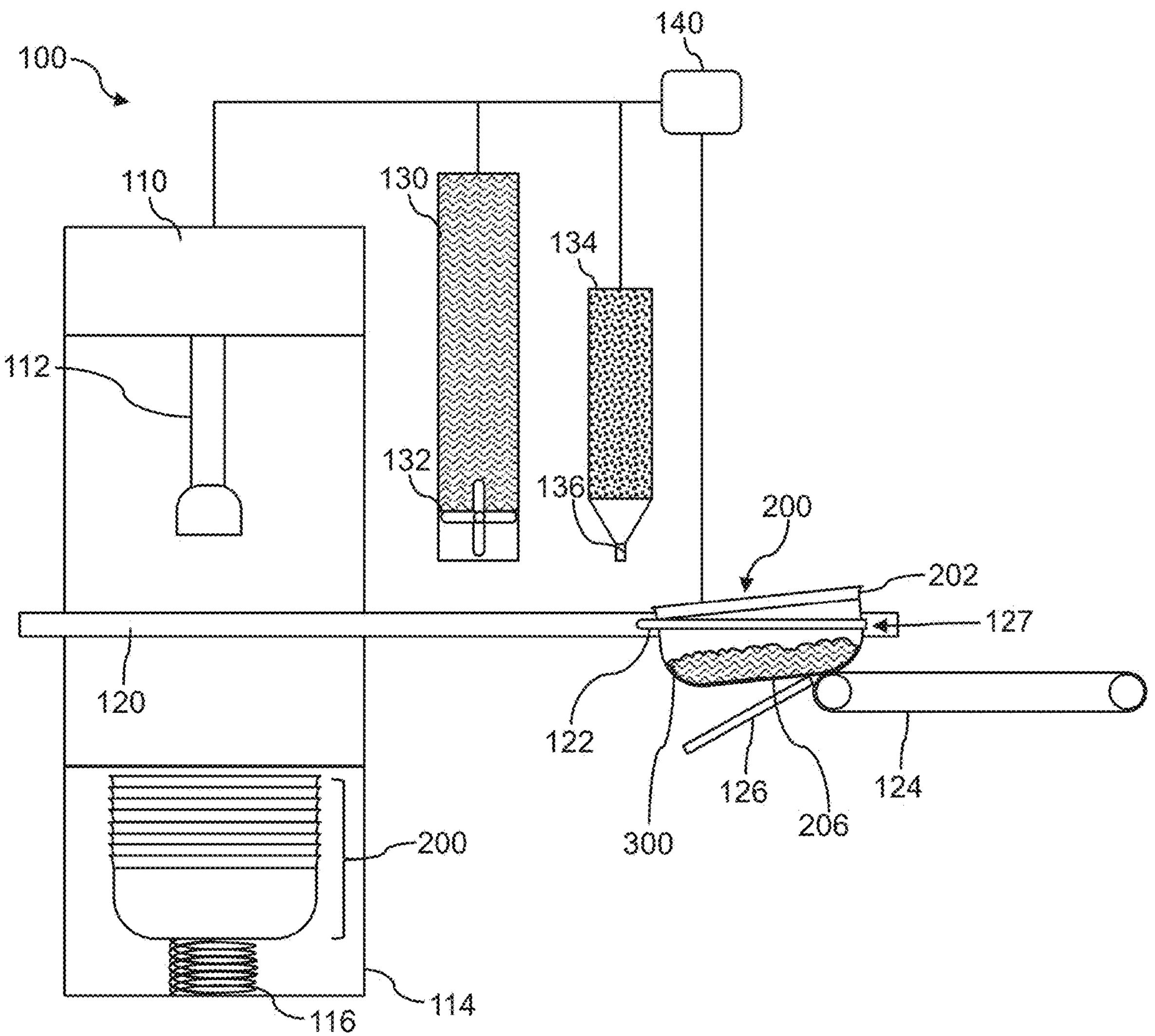
FIG. 6E is a side schematic of the meal production system of FIG. 1 in a fifth state.

FIG. 6E is a side schematic of the meal production system 100 of FIG. 1 in a fifth state. As shown in FIG. 6E, the meal receptacle holder 122 has been moved further along the track 120. In particular, the meal receptacle holder 122 has been moved to a position where the bottom portion 206 of the meal receptacle 200 engages a meal receptacle lifter. As shown in FIG. 6E, the meal receptacle lifter includes an extraction actuator 124 and an extractor plate 126. The extractor plate 126 is inclined relative to the path of travel of the meal receptacle 200 along the track 120. Accordingly, as shown in FIG. 6E, the extractor plate has contacted the bottom portion 206 of the meal receptacle and has lifted the meal receptacle relative to the meal receptacle holder. In particular, a front portion of the meal receptacle has been lifted so that the front portion of the rim 202 is no longer in contact with the meal receptacle holder 122. The extractor plate 126 also guides the meal receptacle onto the extraction actuator 124, which similarly engages the bottom portion 206 of the meal receptacle and beings to apply a force to the meal receptacle in a direction away from the meal receptacle holder. That is, the extraction actuator applies a force to remove the meal receptacle from an open end 127 of the meal receptacle holder 122, as discussed previously with reference to FIGS. 3A-3D. According to the embodiment of FIG. 6E, the meal receptacle holder 122 may inhibit the meal receptacle 200 from being removed from the meal receptacle holder via the open end 127 until the rim 202 is moved out of engagement with the meal receptacle holder 122. Accordingly, by lifting the meal receptacle relative to the meal receptacle holder, the extractor plate 126 and extraction actuator 124 allow the meal receptacle to be removed from the meal receptacle holder via the open end. By lifting the meal receptacle from the bottom portion 206, the meal receptacle lifter may avoid contact with any food safe portions of the meal receptacle. Accordingly, the arrangement shown in FIGS. 6A-6F may promote sanitary conditions for the meal receptacle and may also avoid disturbing any meal ingredients contained in the meal receptacle.

Figure 6F:
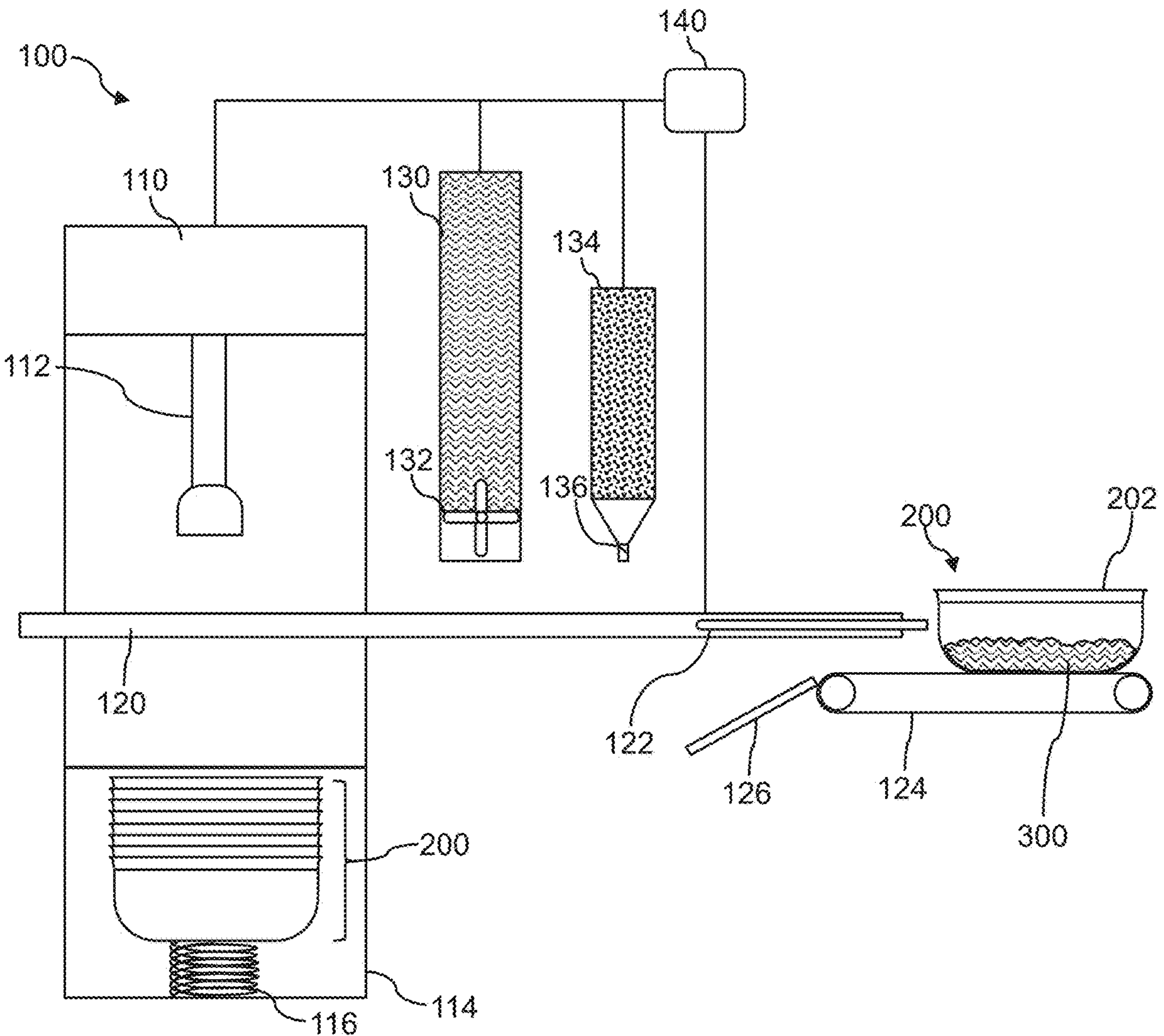
FIG. 6F is a side schematic of the meal production system of FIG. 1 in a sixth state.

FIG. 6F is a side schematic of the meal production system 100 of FIG. 1 in a sixth state. As shown in FIG. 6F, the meal receptacle holder 122 has stopped on the track 120 and the extraction actuator 124 has removed the meal receptacle 200 from the meal receptacle holder. As noted previously, the extraction actuator 124 is positioned relative to the meal receptacle holder 122 so that the rim 202 of the meal receptacle 200 is disengaged from the meal receptacle holder 122 when the meal receptacle is supported by the extraction actuator. Once the meal receptacle is clear of the meal receptacle holder 122, the meal receptacle holder may continue along the track and return to a starting position to receive another meal receptacle from the meal receptacle dispenser 110. Accordingly, the process shown in FIGS. 6A-6F may start with an order submitted by a user, and end with a finished meal removed from the track 120 and delivered to the user via the extraction actuator. As will be discussed further with reference to FIGS. 9A-9H, the meal production system may run multiple meal receptacles on the track 120 at the same time to improve throughput relative to a system running one meal receptacle on the track 120 at one time. The process of FIGS. 6A-6F may be repeated for each order received from a user.

While in the embodiment of FIGS. 6A-6F a stationary extractor plate 126 is employed, in other embodiments the extractor plate may be coupled to an actuator and configured to move between an engaged position and a disengaged position. For example, the extractor plate 126 may be coupled to an actuator such as a linear actuator configured to move the extractor plate in a vertical direction relative to the meal receptacle holder 122. The extractor plate may be positioned in a disengaged position where the extractor plate is not in the path of a meal receptacle. When a meal receptacle is positioned over the extractor plate, the extractor plate may move to an engaged position where the extractor plate lifts the meal receptacle as the extractor plate moves from the disengaged position to the engaged position. In some embodiments, a movable extractor plate may not be inclined, such that the meal receptacle may be lifted without inclining the meal receptacle. In other embodiments, any suitable arrangement for a lifter including an actuator may be employed, as the present disclosure is not so limited.

Figure 7:
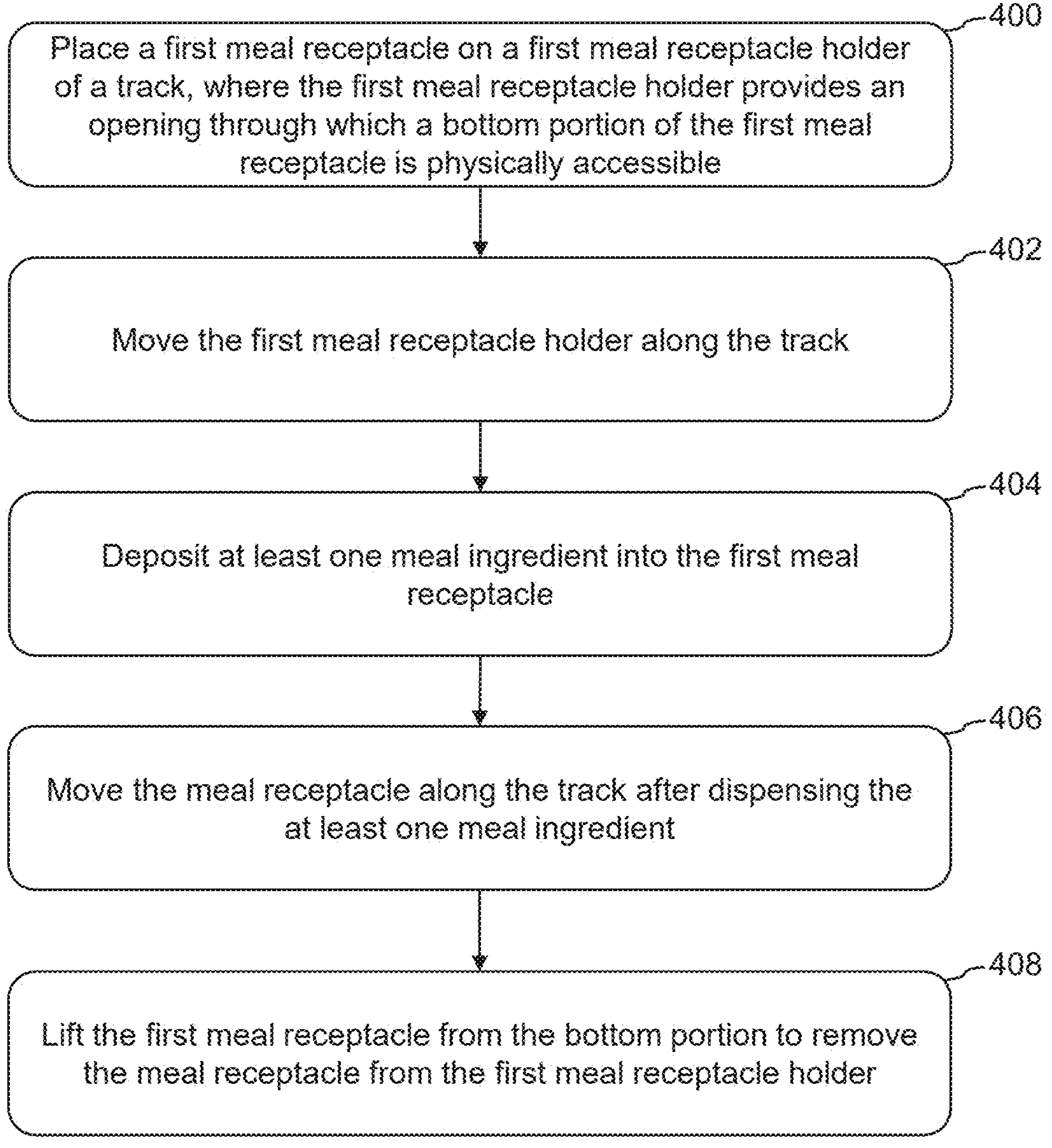
FIG. 7 is a flow chart for one embodiment of a method of operating a meal production system.

FIG. 7 is a flow chart for one embodiment of a method of operating a meal production system. In step 400, a first meal receptacle is placed in a first meal receptacle holder of a track, where the first meal receptacle holder provides an opening through which a bottom portion of the first meal receptacle is physically accessible. For example, in some embodiments, the meal receptacle holder may engage only side walls and/or a rim of the meal receptacle, such that the bottom portion of the meal receptacle is exposed. In step 402, the first meal receptacle holder is moved along the track. For example, a machine controller may command the meal receptacle holder to move along the track. In step 404, at least one meal ingredient may be deposited into the first meal receptacle. In some embodiments the meal receptacle holder may be stopped or slowed at a position associated with a meal ingredient dispenser configured to dispense the at least one meal ingredient into the meal receptacle. In step 406, the meal receptacle is moved along the track after the dispensing of at least one meal ingredient. In step 408, the first meal receptacle is lifted from the bottom portion of the meal receptacle to remove the meal receptacle from the first meal receptacle holder. For example, in some embodiments an extractor, such as an inclined extractor plate, may lift the first meal receptacle from the bottom portion. In some embodiments, an extraction actuator may lift the first meal receptacle from the bottom portion of the meal receptacle. In some embodiments, both an extractor plate and an extraction actuator may lift the meal receptacle from the bottom portion. In some embodiments, the method also includes applying a force to the meal receptacle to move the meal receptacle out of an open end of the meal receptacle holder. For example, in some embodiments an extraction actuator may apply a force to the bottom portion of the meal receptacle to move the meal receptacle out of an open end of the meal receptacle holder.

Figure 8A:
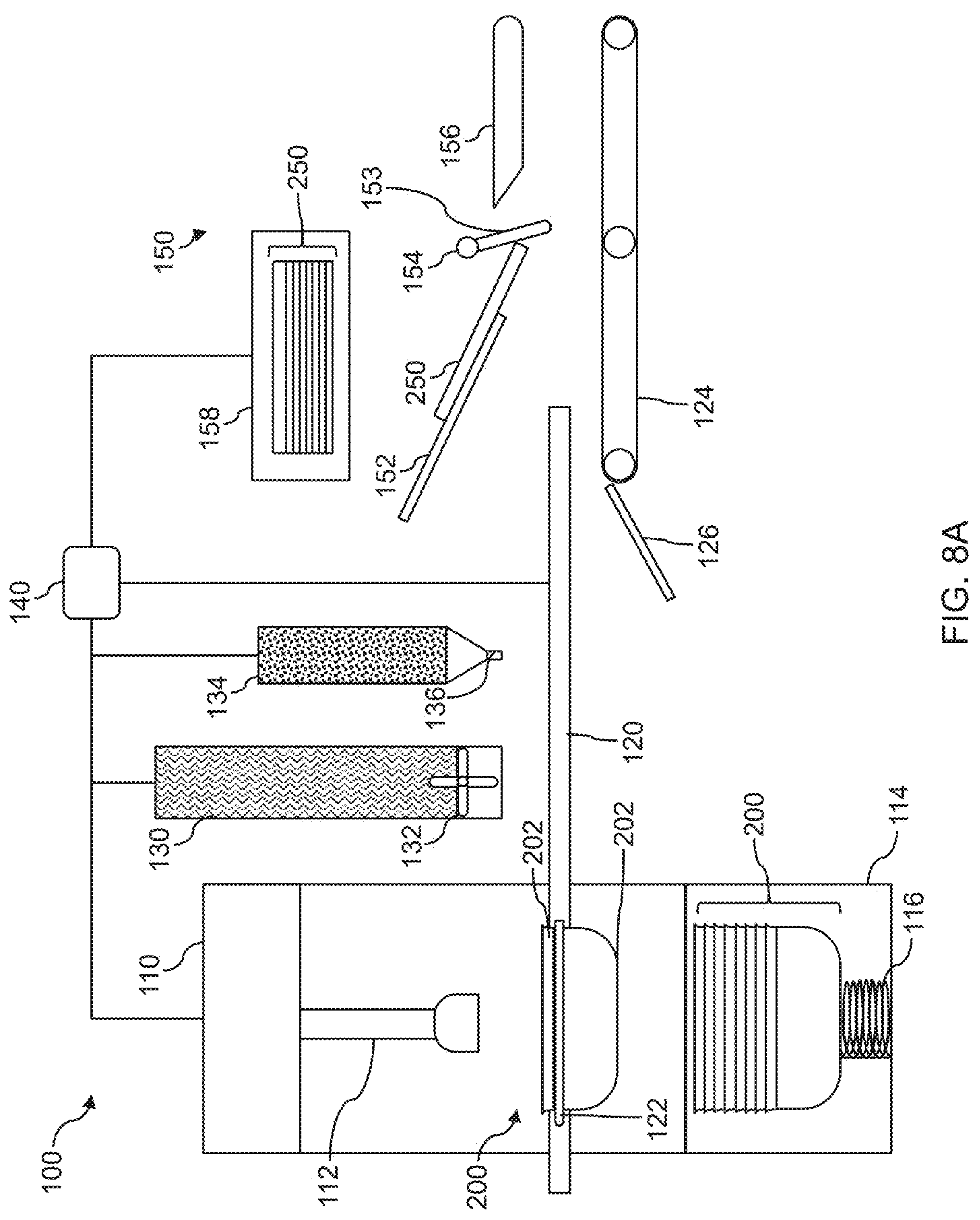
FIG. 8A is a side schematic of another embodiment of a meal production system in a first state.

FIGS. 8A-8G are side schematics of another embodiment of a meal production system 100 going through various states of a meal production process. As shown in FIG. 8A, the meal production system is largely similar to that described with reference to FIGS. 6A-6F. The meal production system 100 includes a meal receptacle dispenser 110 configured to selectively place a meal receptacle 200 onto a meal receptacle holder 122 that is configured to move along a track 120. The meal receptacle holder 122 engages a rim 202 of the meal receptacle, leaving a bottom portion 206 of the meal receptacle exposed and physically accessible. The meal production system also includes a first meal ingredient dispenser 130 having a paddle 132 and a second meal ingredient dispenser 134 including a nozzle 136. The meal production system also includes a meal receptacle lifter having an extractor plate 126 and an extraction actuator 124 similar in function to those described with reference to FIGS. 6A-6F.

Figure 8B:
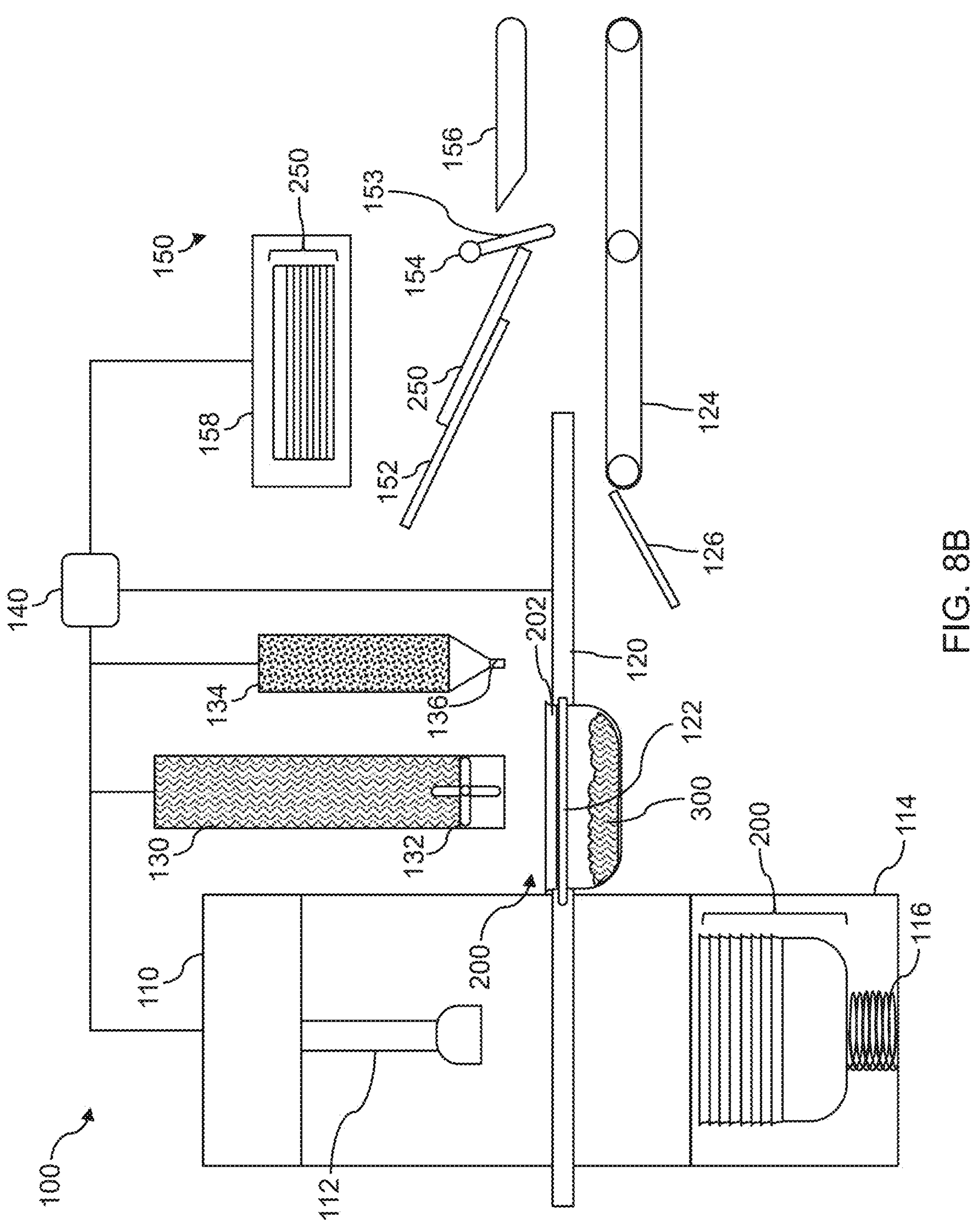
FIG. 8B is a side schematic of the meal production system of FIG. 8A in a second state.
Figure 8C:
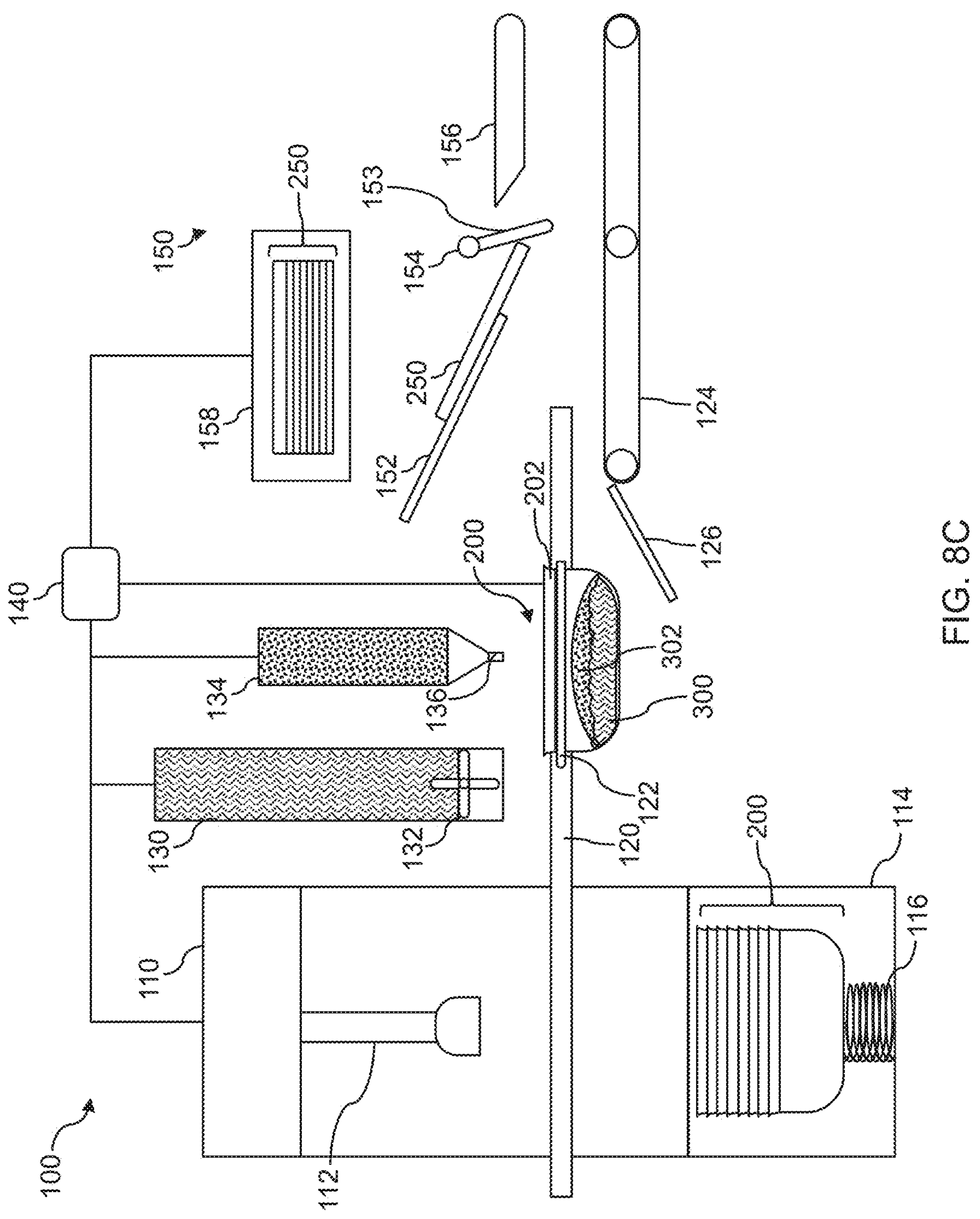
FIG. 8C is a side schematic of the meal production system of FIG. 8A in a third state.
Figure 8D:
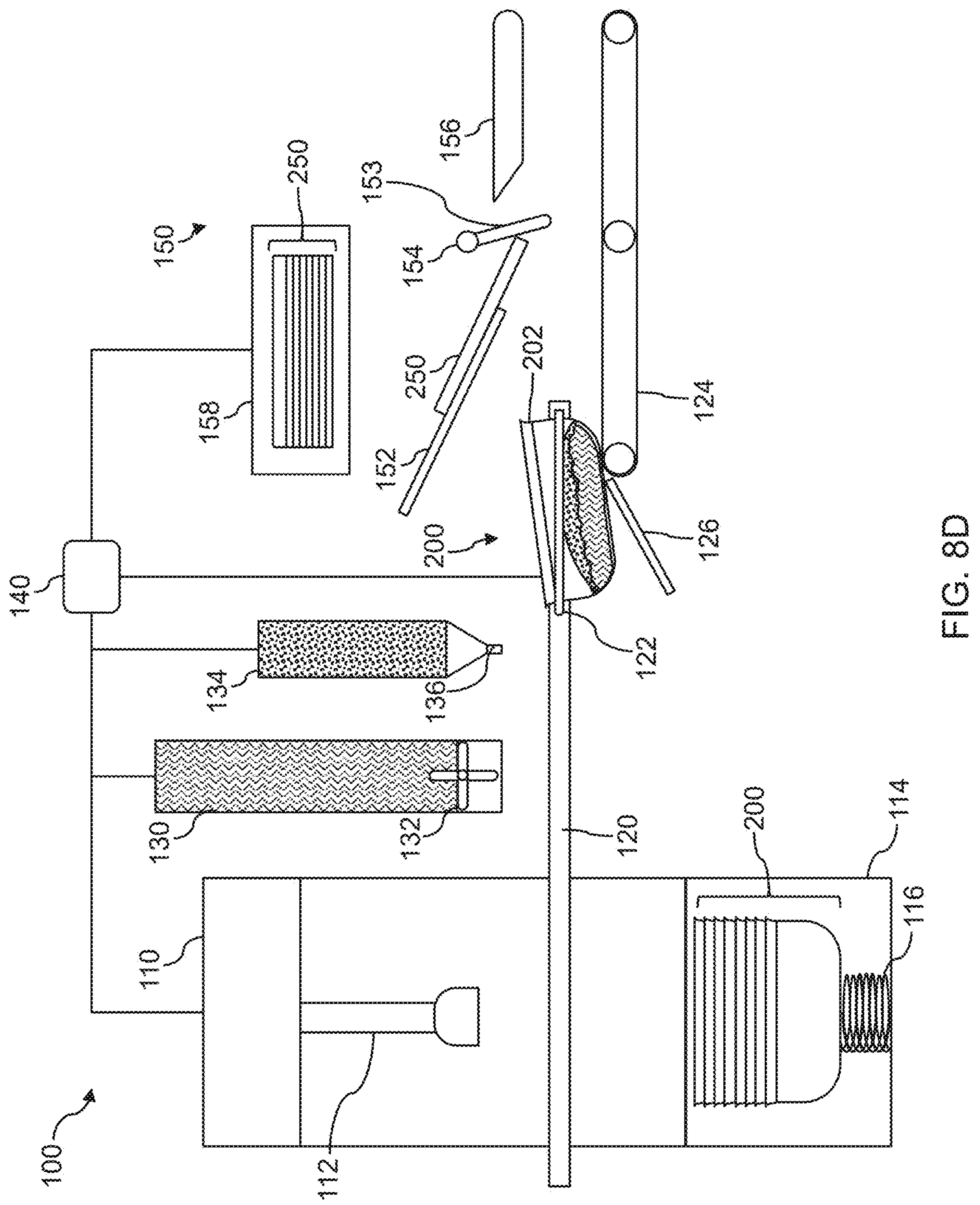
FIG. 8D is a side schematic of the meal production system of FIG. 8A in a fourth state.
Figure 8E:
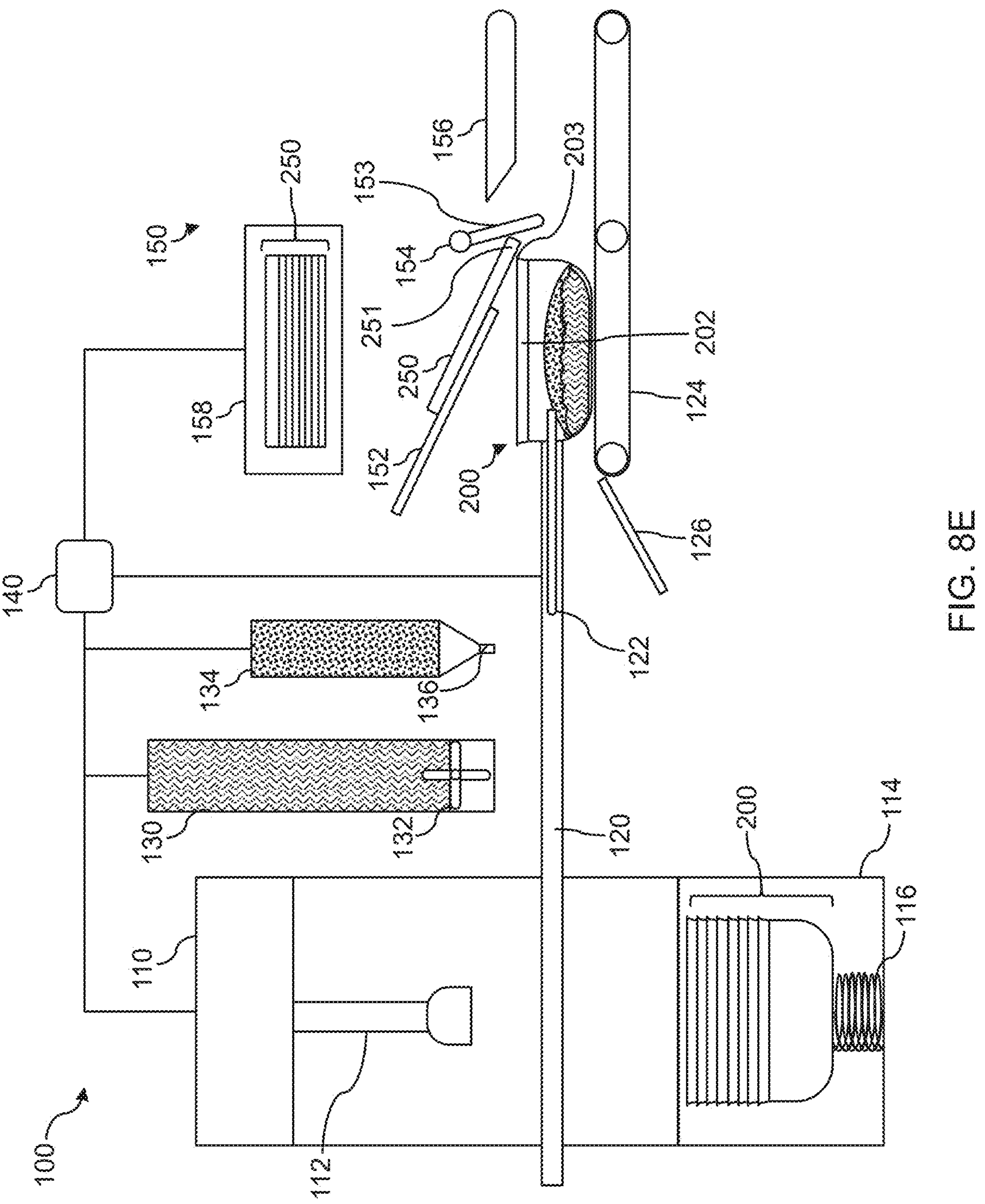
FIG. 8E is a side schematic of the meal production system of FIG. 8A in a fifth state.
Figure 8F:
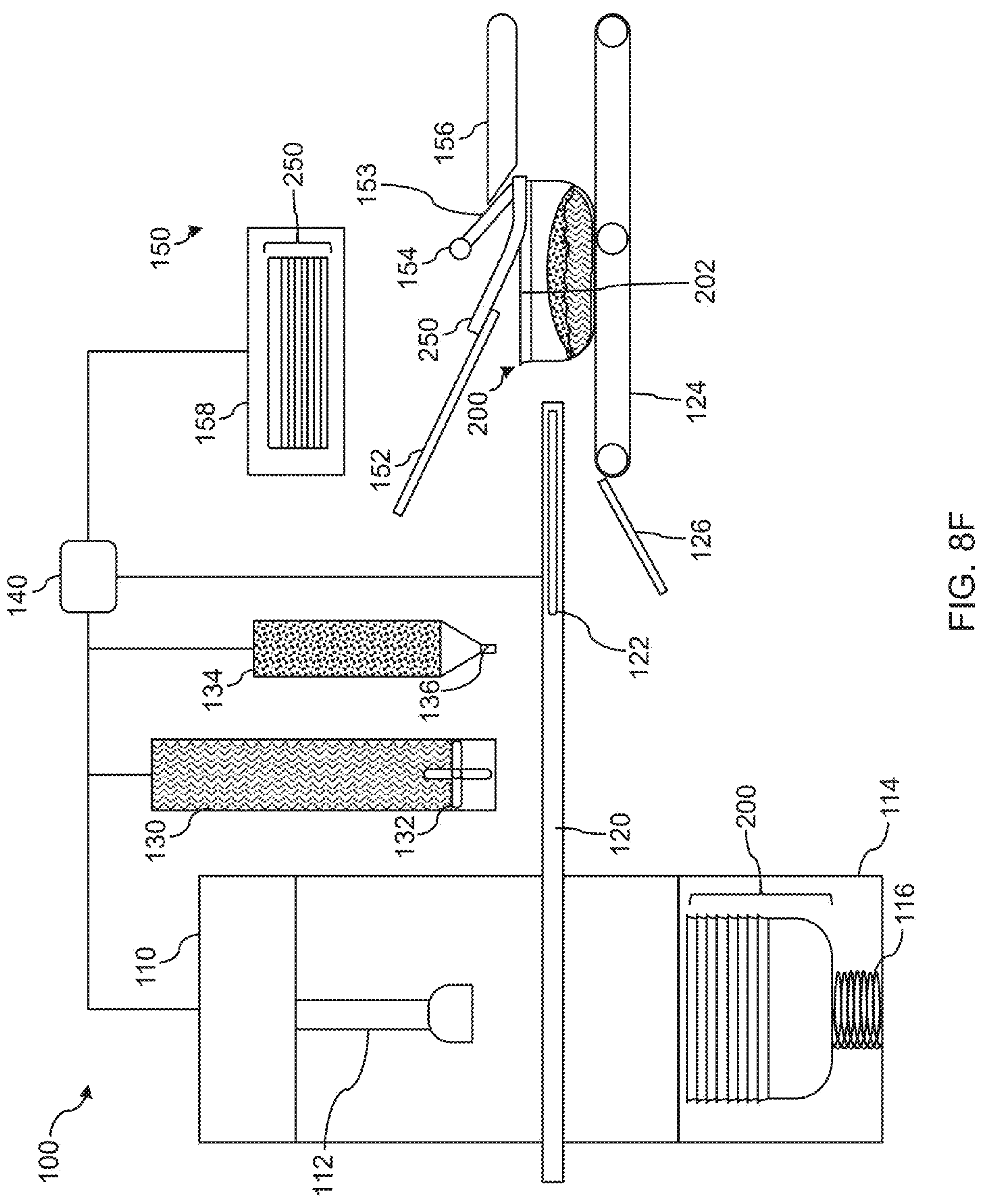
FIG. 8F is a side schematic of the meal production system of FIG. 8A in a sixth state.

In contrast to previously described embodiments, the meal production system 100 of FIGS. 8A-8G includes a lidder 150 configured to automatically close meal receptacles 200 when the meal receptacles are removed from the track 120 by the meal receptacle lifter. The lidder 150 includes a lid feeder 152 which is configured to support a single lid 250 in a loading position. The lid feeder 152 is inclined relative to a path of the meal receptacle 200 as it moved along the track 120 and the extraction actuator 124. In the specific embodiment of FIGS. 8A-8G, the lid feeder is inclined relative to a horizontal plane. The lidder also includes a wiper 153 which is rotatable about a pivot (e.g., hinge) 154. The wiper 153 is configured to engage the lid 250 to inhibit the lid from sliding down the lid feeder 152. According to the state shown in FIG. 8A, the lid 250 positioned on the lid feeder 152 is kept in a position that is in the path of a meal receptacle 200 moving along the extraction actuator 124. As will be discussed further with reference to FIGS. 8E-8G, this arrangement allows the lid 250 to engage and close the meal receptacle as the meal receptacle moves past the lid feeder. The lidder 150 also includes a seater 156 that is configured to press the lid 250 onto a meal receptacle 200 to close an opening of the meal receptacle. As shown in FIG. 8F, the lidder 150 also includes a lid hopper 158 containing a stack of lids 250. The lid hopper 158 is configured to selectively deposit a single lid onto the lid feeder 152. As the lid is deposited onto the feeder 152, the lid may slide down the lid feeder until the lid is stopped by the wiper 153. The lid may remain in position on the lid feeder until a meal receptacle 200 passes the lid feeder and engages the lid 250.

In the state of FIG. 8A, a meal receptacle 200 has been placed onto the meal receptacle holder 122 by the arm 112. Accordingly, the meal receptacle is ready to be moved along the track 120 by the meal receptacle holder 122.

FIG. 8B is a side schematic of the meal production system 100 of FIG. 8A in a second state, and FIG. 8C is a side schematic of the meal production system in a third state. In the states of FIGS. 8B and 8C, the meal receptacle 200 is moved to positions associated with the first meal ingredient dispenser 130 and the second meal ingredient dispenser 134, respectively. In FIG. 8B, the meal receptacle has been moved to a position associated with the first meal ingredient dispenser, whereupon a paddle 132 has been rotated to dispense a first meal ingredient 300 into the meal receptacle 200. In FIG. 8C, the meal receptacle has been moved to a position associated with the second meal ingredient dispenser, whereupon a nozzle 136 has been opened to dispense a second meal ingredient 302 into the meal receptacle 200. The meal receptacle 200 may be stopped or slowed by the meal receptacle holder 122 at each of the track positions associated with the first meal ingredient dispenser and the second meal ingredient dispenser. It should be noted that the first meal ingredient dispenser and second meal ingredient dispenser are merely representative, and a meal production system may include any number and type of meal ingredient dispensers, as the present disclosure is not so limited.

FIG. 8D is a side schematic of the meal production system 100 of FIG. 8A in a fourth state. In the state of FIG. 8D, the meal receptacle 200 has been moved into engagement with the meal receptacle lifter. Similar to the process described with reference to FIGS. 6E-6F, a bottom portion of the meal receptacle engages the extractor plate 126 which lifts the meal receptacle relative to the meal receptacle holder 122. In particular, the extractor plate 126 and extraction actuator 124 lift the meal receptacle so that the rim 202 of the meal receptacle is no longer engaged with the meal receptacle holder 122. The extraction actuator 124 applies a force to the bottom portion of the meal receptacle to move the meal receptacle out of an open end of the meal receptacle holder 122.

FIG. 8E is a side schematic of the meal production system 100 of FIG. 8A in a fifth state. As shown in FIG. 8E, the meal receptacle 200 has been removed from the meal receptacle holder 122 by the extraction actuator 124. In the state shown in FIG. 8E, a leading portion 203 of the meal receptacle is adjacent the lid 250 positioned on the lid feeder 152. The lid 250 has a shape corresponding to the shape of the rim 202 of the meal receptacle. The lid 250 is in the path of the leading portion 203 as the meal receptacle is moved by the extraction actuator. Accordingly, a leading portion 251 of the lid is configured to engage the leading portion 203 of the meal receptacle as the meal receptacle moves past the lid feeder 152. The engagement between the lid and the meal receptacle may allow the meal receptacle to drag the lid 250 down the lid feeder against the resistive force of the wiper 153. According to the embodiment of FIG. 8E, the wiper 153 is rotatable about the pivot (e.g., hinge) 154, and is biased toward a blocking position as shown in FIG. 8E. In some embodiments, the pivot 154 may include a biasing member such as a torsion spring configured to bias the wiper 153 to the blocking position. Accordingly, whenever the wiper is rotated from the blocking position, the biasing member may apply a biasing force to the wiper to urge the wiper toward the blocking position. Thus, when the meal receptacle 200 engages the lid 250, the meal receptacle may rotate the wiper 153 away from the blocking position against the biasing force of the biasing member. In particular, as shown in FIG. 8F, the wiper 153 may be rotated to an unblocking position where the wiper 153 allows the lid 250 to move past the wiper. Of course, while in some embodiments the biasing member may be a spring, any suitable arrangement may be employed for a wiper. For example, in some embodiments a wiper may be formed of an elastic material that is elastically deformable to an unblocking position. In such an embodiment, the elasticity of the wiper may function to bias the wiper toward the blocking position.

FIG. 8F is a side schematic of the meal production system 100 of FIG. 8A in a sixth state. As discussed above with reference to FIG. 8E, the wiper 153 of the lidder is in the unblocking position in FIG. 8F. Accordingly, as the meal receptacle 200 is moved along the extraction actuator 124, the lid slides down the lid feeder 152 between the wiper 153 and the rim 202 of the meal receptacle. In some embodiments, as the lid moved between the wiper 153 and the rim 202, the wiper 153 may apply a force to the lid in a direction of the rim 202. This force may be a pressing force configured to at least partially seat the lid 250 on the rim 202. The pressing force may be generated by a biasing force urging the wiper 153 to the blocking position. As the meal receptacle 200 and lid 250 pass under the wiper 153, the meal receptacle and lid may engage the seater 156 that is configured to seat the lid 250 on the rim 202 of the meal receptacle so that the meal receptacle is closed, as will be discussed below with reference to FIG. 8G.

Figure 8G:
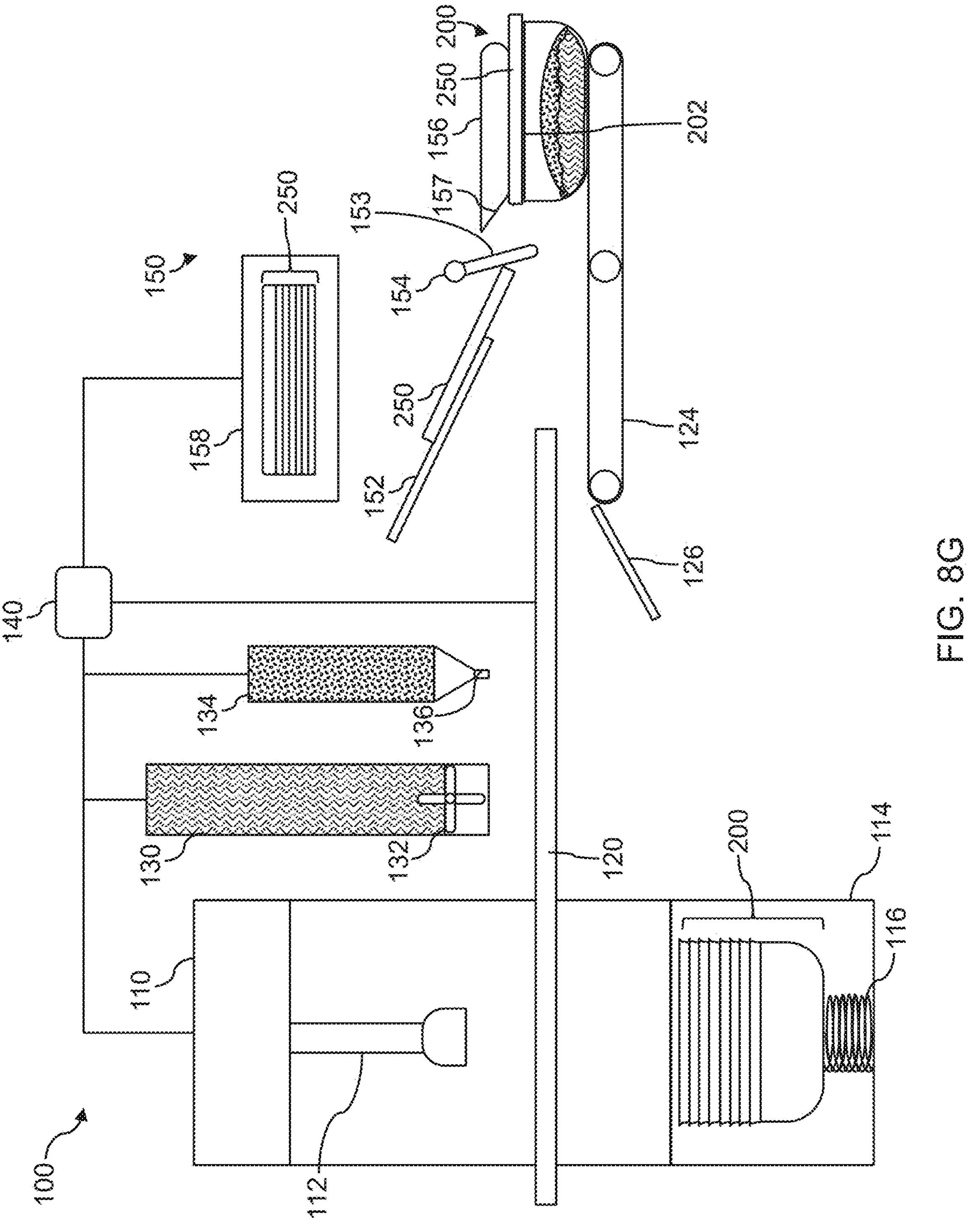
FIG. 8G is a side schematic of the meal production system of FIG. 8A in a seventh state.

FIG. 8G is a side schematic of the meal production system 100 of FIG. 8A in a seventh state. As shown in FIG. 8G, the meal receptacle 200 and lid 250 have passed the wiper 153. Accordingly, the wiper returns to a blocking position. Accordingly, the lid hopper 158 is able to deposit another lid onto the lid feeder 152, which is then held in position by the wiper 153. According to the embodiment of FIG. 8G, the seater 156 is spaced from the extraction actuator such that the lid 250 and meal receptacle are not able to fit through the passage unless the lid 250 is closed against the rim 202. Accordingly, the seater 156 physically engages the lid 250 to press the lid 250 onto the rim as the meal receptacle and lid move through the passage between the seater and the extraction actuator. The seater 156 includes a lead-in portion 157, which may be tapered or wedge-shaped as shown, which provides a transition to the minimum spacing between the seater 156 and the extraction actuator 124, so that the lid 250 may be progressively closed against the rim 202 as the meal receptacle and lid move through the passage. In some embodiments, the seater 156 may be deflectable by the lid and/or meal receptacle 200. In this embodiment, the seater may be configured to apply a threshold closing force to the lid against the meal receptacle. In case the lid 250 is misaligned and is not able to be closed, the seater may apply this threshold force but then deform to allow passage of the meal receptacle and lid. Such an arrangement may inhibit a meal receptacle and lid jamming in the passage between the seater and the extraction actuator 124. Once the meal receptacle moves through the passage and the lid is closed against the rim 202 of the meal receptacle, the meal receptacle may be prepared for delivery to a user. Additionally, as a lid 250 has been replaced on the lid feeder 152, the lidder 150 may be ready to lid another meal receptacle. Accordingly, the process shown in FIGS. 8A-8G may be repeated for any suitable number of meal receptacles. Additionally, in some embodiments multiple meal receptacles may be position on the track 120 at the same time.

Figure 9A:
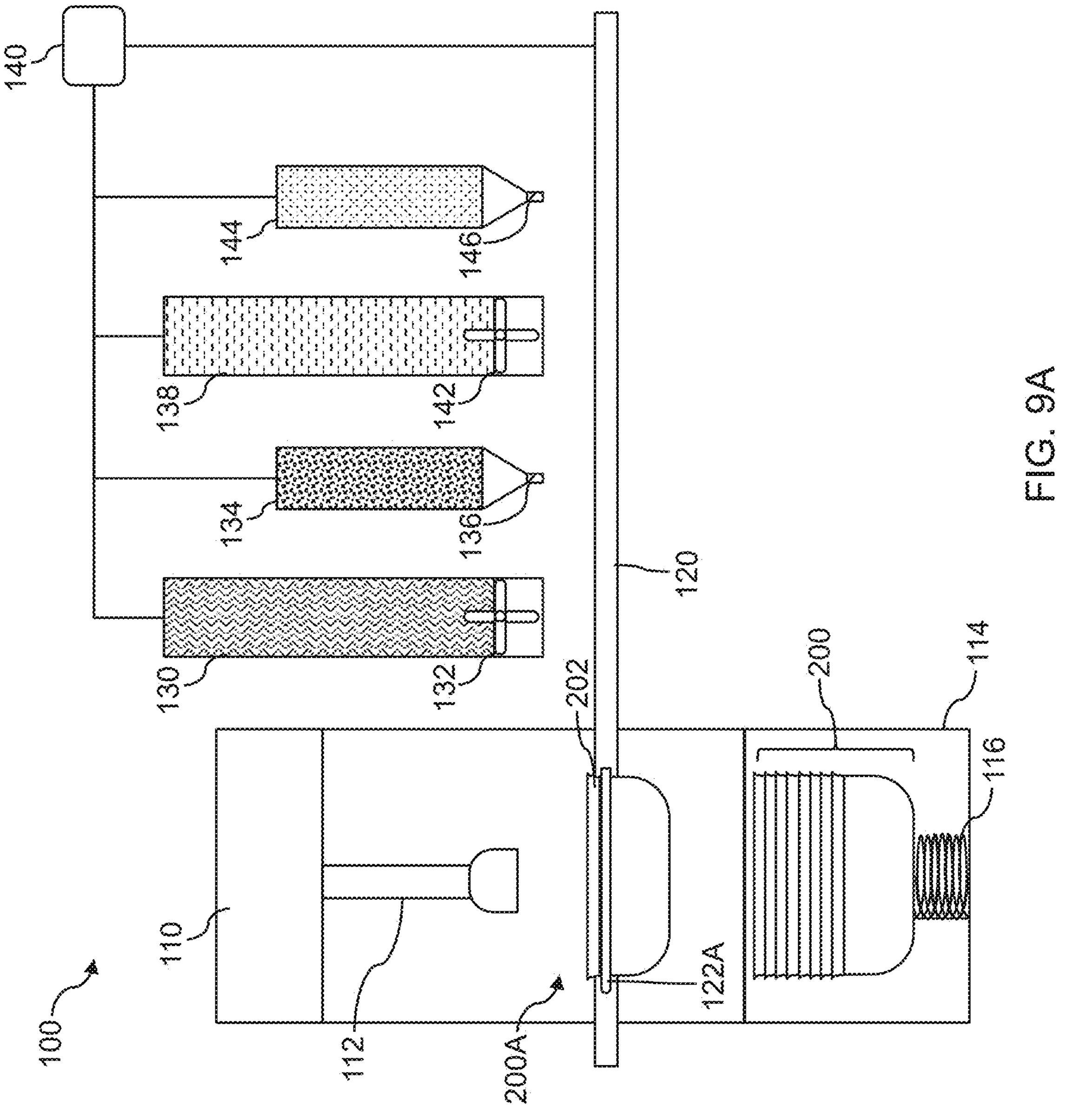
FIG. 9A is a side schematic of another embodiment of a meal production system in a first state.

FIGS. 9A-9H are side schematics of another embodiment of a meal production system 100 in various states of a meal production process. In particular, the embodiment of FIGS. 9A-9H depict a meal production system preparing multiple meals concurrently and controlling multiple meal receptacle holders to avoid collisions between meal receptacles and/or the meal receptacle holders. As shown in FIG. 9A, the meal production system includes a meal receptacle dispenser 110 configured to selectively place a meal receptacle 200 onto a meal receptacle holder 122 from a meal receptacle hopper 114. As shown in FIG. 9A, a first meal receptacle 200A has been placed onto a first meal receptacle holder 122A. As in previously described embodiments, the first meal receptacle holder 122A engages the first meal receptacle 200A by a rim 202 of the first meal receptacle. The meal receptacle holders 122 are configured to move along a track 120. The meal production system also includes a first meal ingredient dispenser 130, a second meal ingredient dispenser 134, a third meal ingredient dispenser 138, and a fourth meal ingredient dispenser 144. In the embodiment of FIG. 9A, the first meal ingredient dispenser 130 and third meal ingredient dispenser 138 are solid meal ingredient dispensers including a first paddle 132 and a third paddle 142 that are rotatable to dispense a first meal ingredient and a third meal ingredient, respectively. The second meal ingredient dispenser 134 and fourth meal ingredient dispenser 144 are liquid meal ingredient dispensers that include a second nozzle 136 and a fourth nozzle 146, respectively. The nozzles 136, 146 are configured to open to dispense a second meal ingredient and a fourth meal ingredient, respectively. The movement of the various actuators and elements of the meal production system of FIG. 9A are controlled by a machine controller 140.

Figure 9B:
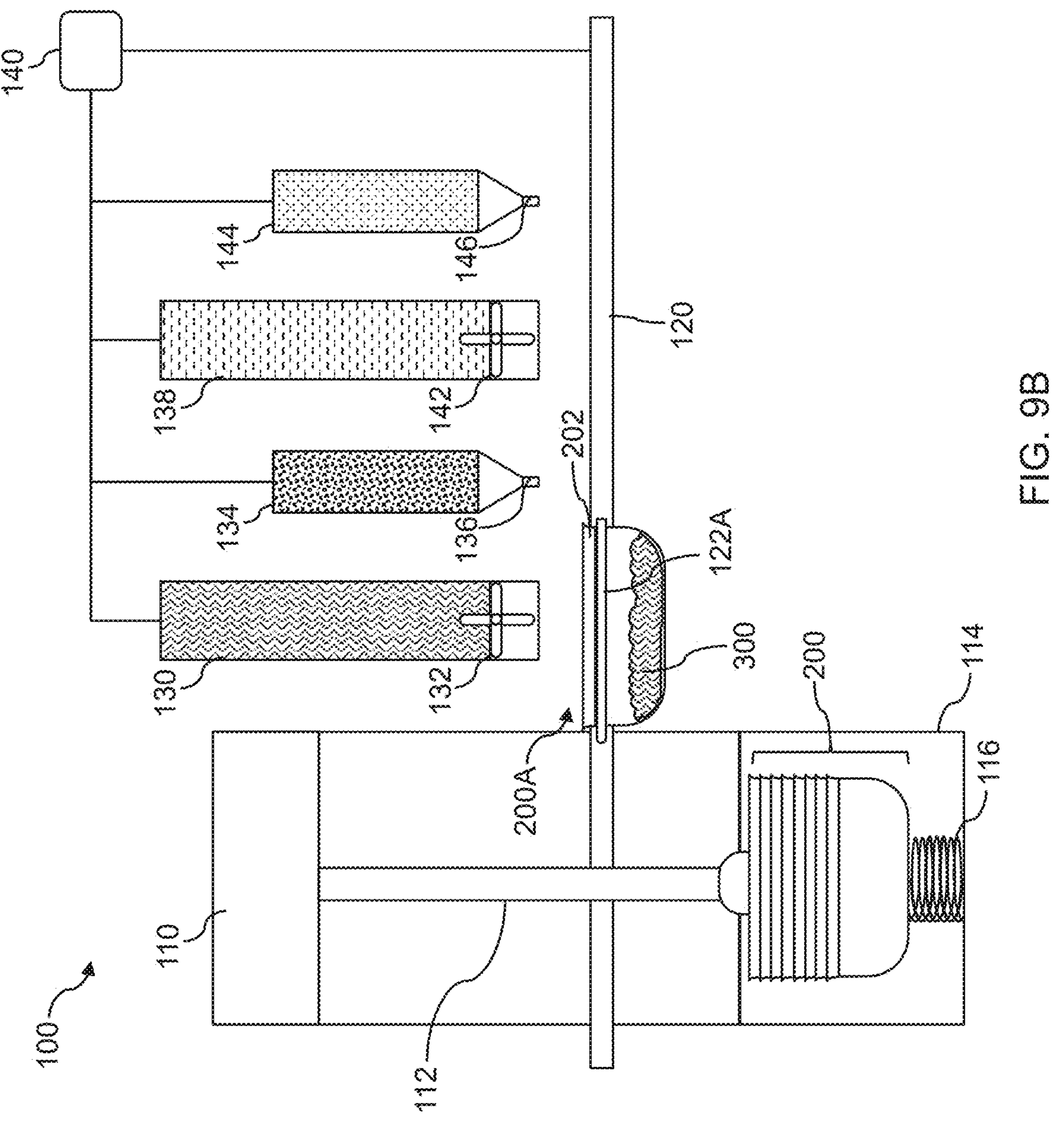
FIG. 9B is a side schematic of the meal production system of FIG. 9A in a second state.

FIG. 9B is a side schematic of the meal production system 100 of FIG. 9A in a second state. As shown in FIG. 9B, the first meal receptacle 200A has been moved by the first meal receptacle holder 122A to a position on the track 120 associated with the first meal ingredient dispenser 130. As shown in FIG. 9B, the first paddle 132 has been rotated to dispense the first meal ingredient 300 into the first meal receptacle. According to the embodiment of FIGS. 9A-9H, the dispensing of meal ingredients into a meal receptacle may be based on an order received from a user that is input at one or more input devices. That is, the machine controller 140 may command the first meal receptacle holder 122A to move to various positions of the track 120 to receive one or more meal ingredients based on the order from the user. Accordingly, each meal receptacle may move to different positions of the track 120 to receive different meal ingredients, depending on the order received by the machine controller 140. In the embodiment of FIG. 9B, the first meal receptacle holder 122A may stop or slow the first meal receptacle 200A at the position associated with the first meal ingredient dispenser so that the first meal ingredient 300 may be reliably dispensed into the first meal receptacle 200A. As shown in FIG. 9B, as the first meal receptacle is at a position associated with the first meal ingredient dispenser, the arm 112 of the meal receptacle dispenser 110 is engaging a second meal receptacle from the meal receptacle hopper 114 to lift the second meal receptacle up to the track 120.

Figure 9C:
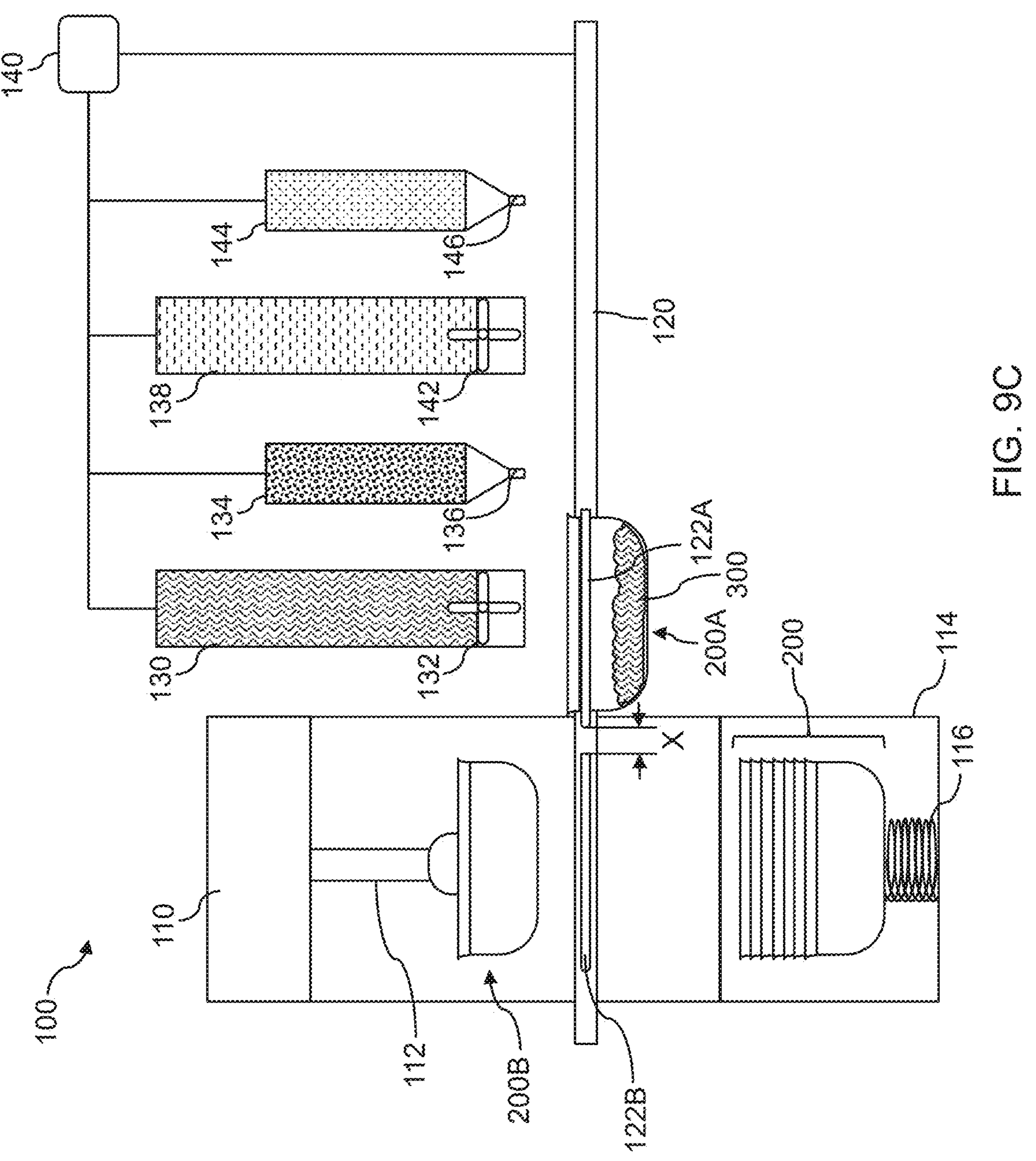
FIG. 9C is a side schematic of the meal production system of FIG. 9A in a third state.

FIG. 9C is a side schematic of the meal production system 100 of FIG. 9A in a third state. According to the embodiment of FIGS. 9A-9H, the machine controller 140 is configured to determine a threshold distance between two or more meal receptacle holders on the track 120. For example, as shown in FIG. 9C the machine controller 140 may determine a threshold distance X between the first meal receptacle holder 122A and the second meal receptacle holder 122B. The determined threshold distance may be based on a collision avoidance distance between the first meal receptacle holder 122A and the second meal receptacle holder 122B, or between the first meal receptacle 200A and the second meal receptacle 200B. The machine controller is configured to move the first and second meal receptacle holders without allowing a distance between the meal receptacles holders to drop below the threshold distance X, as will be shown in FIGS. 9D-9H. As shown in FIG. 9C, the arm 112 has lifted the second meal receptacle 200B above the track 120 and the second meal receptacle holder 122B has moved into position to receive the second meal receptacle 200B.

Figure 9D:
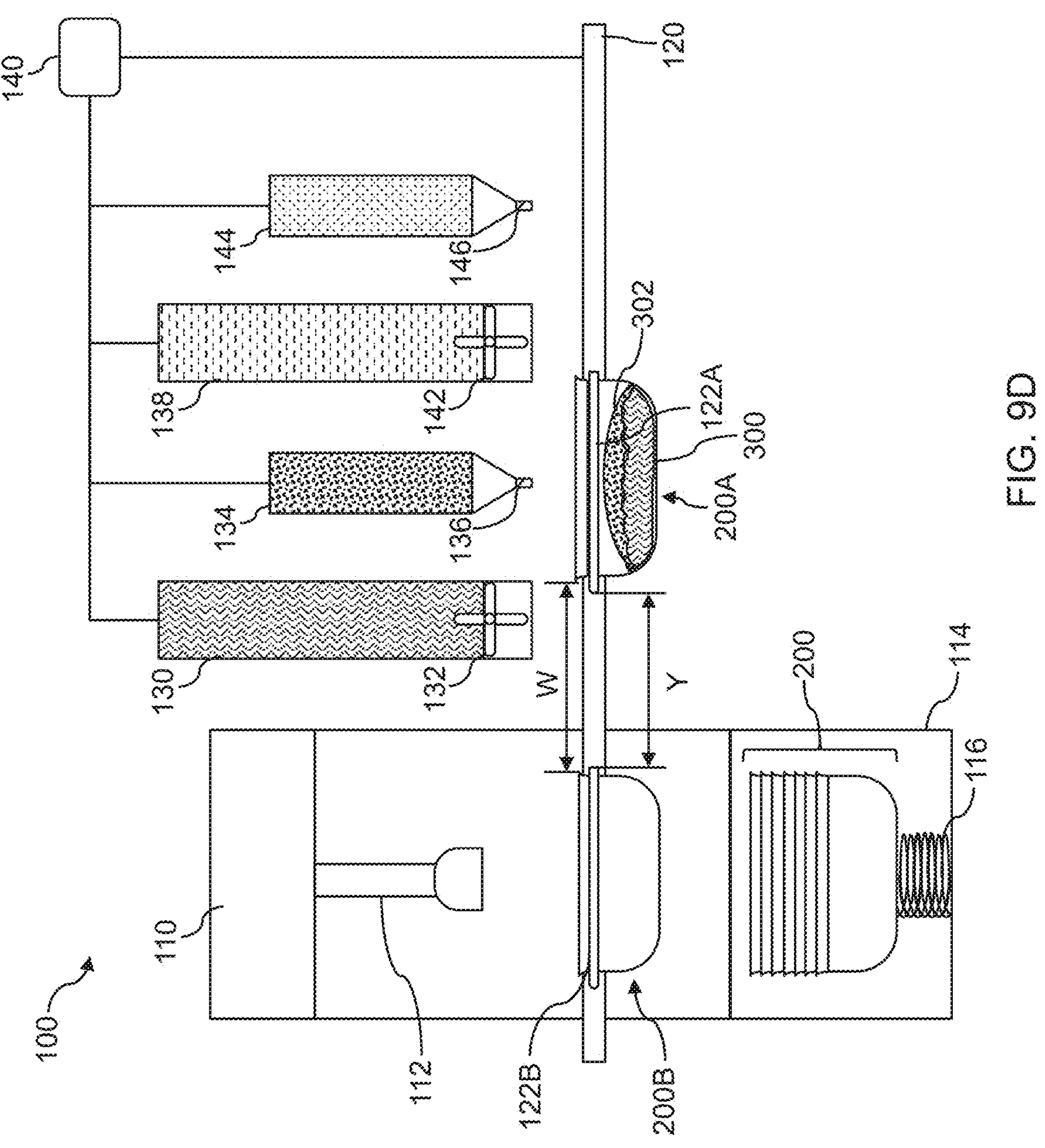
FIG. 9D is a side schematic of the meal production system of FIG. 9A in a fourth state.

FIG. 9D is a side schematic of the meal production system 100 of FIG. 9A in a fourth state. As shown in FIG. 9D, the first meal receptacle has been moved to a position associated with the second meal ingredient dispenser 134. The second nozzle 136 is opened and a second meal ingredient 302 has been dispensed into the first meal receptacle 200A. As shown in FIG. 9D, the second meal receptacle 200B has been released onto the second meal receptacle holder 122B. According to the embodiment of FIGS. 9A-9H, the machine controller may also be configured to determine a threshold distance between first and second meal receptacles on the track 120. In some cases, the threshold distance between first and second meal receptacles may be related to the threshold distance between the respective meal receptacle holders for holding the first and second meal receptacles. Like the threshold distance between meal receptacle holders, the threshold distance between the meal receptacles may be configured as a collision distance between meal receptacles. The machine controller 140 may control the meal receptacle holders so that a distance between meal receptacles is always greater than or equal to the threshold distance. As shown in FIG. 9D, both a distance between first and second meal receptacles W and a distance between first and second meal receptacle holders Y exceed their respective threshold distances. Accordingly, the second meal receptacle holder is allowed to move toward the first meal receptacle holder 122A. Of course, while in the embodiment of FIGS. 9A-9H two threshold distances are employed, in some embodiments a single threshold distance may be determined between meal receptacles, meal receptacle holders, or a meal receptacle and meal receptacle holder, as the present disclosure is not so limited.

Figure 9E:
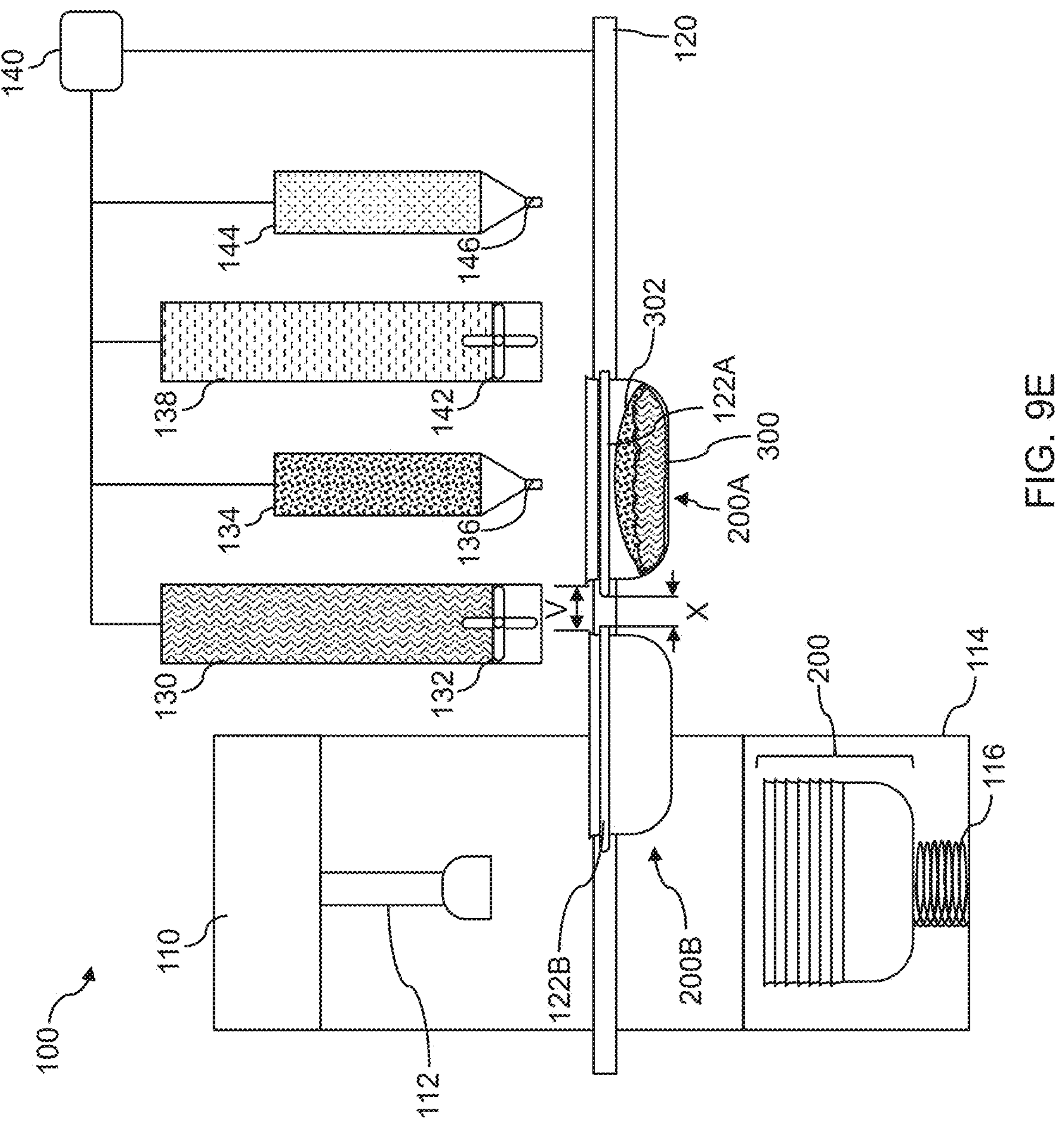
FIG. 9E is a side schematic of the meal production system of FIG. 9A in a fifth state.

FIG. 9E is a side schematic of the meal production system 100 of FIG. 9A in a fifth state. As shown in FIG. 9E, the second meal receptacle 200B has moved toward the first meal receptacle 200A. The second meal receptacle 200B may be assigned to receive one or more meal ingredients from the meal ingredient dispensers. Accordingly, the second meal receptacle holder 122B may be assigned to move to one or more position along the track 120 to receive the assigned meal ingredients. However, as shown in FIG. 9E, if the first meal receptacle 200A and first meal receptacle holder 122A are blocking the second meal receptacle, the second meal receptacle may stop or slow to ensure a distance between the meal receptacles and the meal receptacle holders does not fall below the threshold distances determined by the machine controller. That is, as shown in FIG. 9E, the machine controller will stop or slow the first meal receptacle holder 122B so that a distance between the first meal receptacle holder 122A and the second meal receptacle holder does not fall below the threshold distance X. Likewise, the machine controller will stop or slow the first meal receptacle holder 122B so that a distance between the first meal receptacle 200A and the second meal receptacle 200B does not fall below the threshold distance V. In this manner, the second meal receptacle holder 122B may closely follow the first meal receptacle holder 122A, while ensuring there are no collisions on the track 120. In the state of FIG. 9E the first meal receptacle 200A has been stopped or slowed at a position associated with the second meal ingredient dispenser 134 and has received a second meal ingredient 302.

Figure 9F:
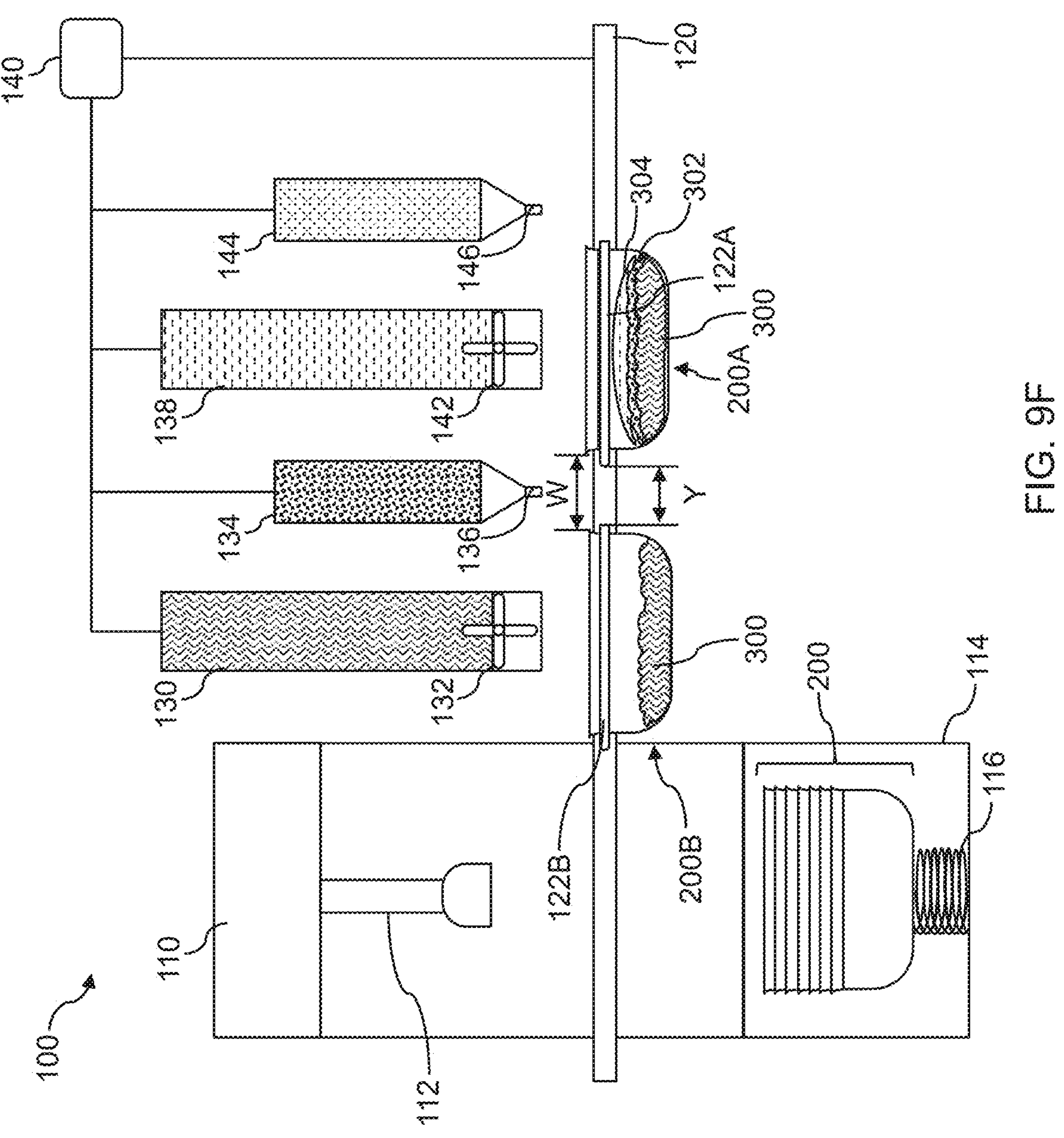
FIG. 9F is a side schematic of the meal production system of FIG. 9A in a sixth state.

FIG. 9F is a side schematic of the meal production system 100 of FIG. 9A in a sixth state. As shown in FIG. 9F, the first meal receptacle 200A has moved to a position on the track 120 associated with the third meal ingredient dispenser 138. In particular, the first meal receptacle has stopped or slowed at the position associated with the third meal ingredient dispenser 138 and has received a third meal ingredient 304. As the first meal receptacle 200A is advanced along the track 120, the second meal receptacle 200B was able to move to a position associated with the first meal ingredient dispenser 130 and has received the first meal ingredient 300. As shown in FIG. 9F, the distance between the meal receptacles W and distance between the meal receptacle holders Y remains larger than the respective threshold distances.

Figure 9G:
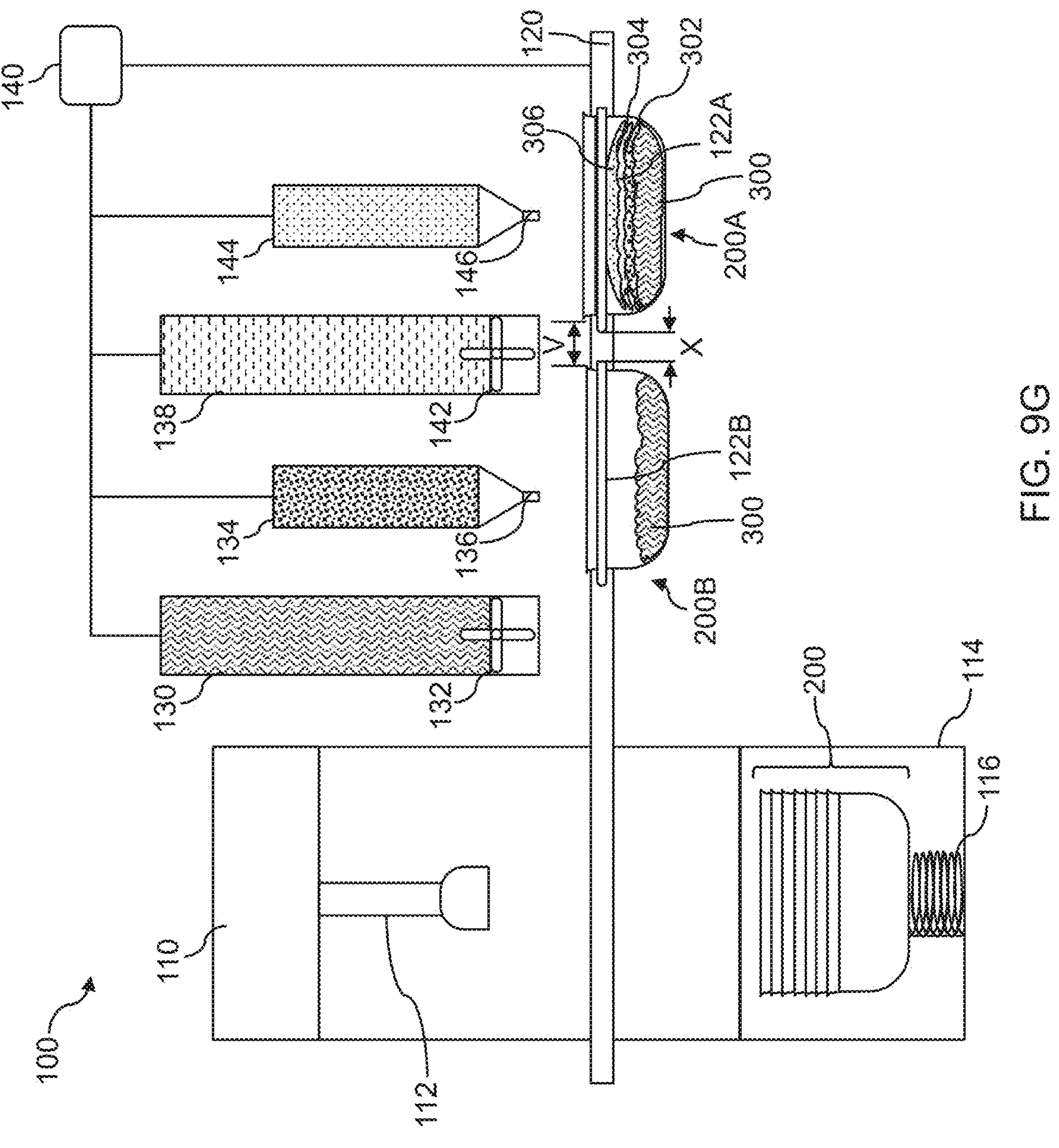
FIG. 9G is a side schematic of the meal production system of FIG. 9A in a seventh state.
Figure 9H:
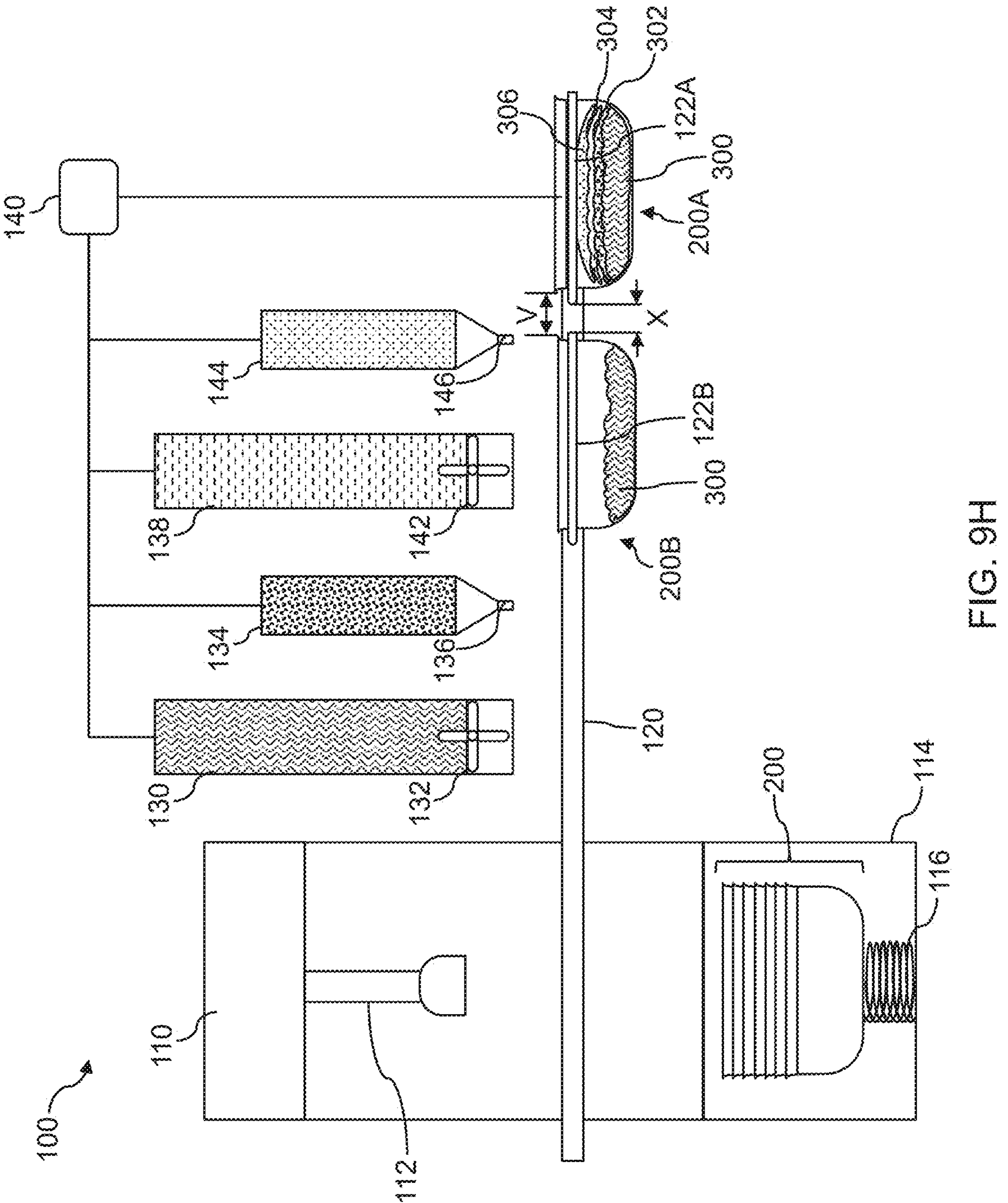
FIG. 9H is a side schematic of the meal production system of FIG. 9A in an eighth state.

FIG. 9G is a side schematic of the meal production system 100 of FIG. 9A in a seventh state. As shown in FIG. 9G, the first meal receptacle 200A has moved to a position on the track 120 associated with the fourth meal ingredient dispenser 144. In particular, the first meal receptacle has stopped or slowed at the position associated with the fourth meal ingredient dispenser 144 and has received a fourth meal ingredient 306. According to the embodiment of FIG. 9G, the second meal receptacle is not assigned to receive any other meal ingredients other than the first meal ingredient 300. Accordingly, the second meal receptacle 200B is assigned to move to an end of the track 120 where the second meal receptacle may be removed from the track by a meal receptacle lifter. However, as the first meal receptacle is stopped or slowed at the fourth meal ingredient dispenser 144, the second meal receptacle holder 122B may be correspondingly stopped or slowed behind the first meal receptacle holder 122A to avoid collision. That is, the distance between the first and second meal receptacles may be kept greater than or equal to threshold distance V, and the distance between the first and second meal receptacle holders may be kept greater than or equal to threshold distance X. The second meal receptacle holder 122B may follow the first meal receptacle holder 122A while maintaining this threshold distance, as shown in the state of FIG. 9H. In this manner, trailing meal receptacles advance as far as possible along the track 120 to make space available to following meal receptacles. The process shown in FIGS. 9A-9H may be employed for any number of meal receptacles and any number of meal ingredient dispensers, as the present disclosure is not so limited.

It should be noted that various embodiments of meal production systems described herein and associated methods may be combined with one another. For example, the method of control described with reference to FIGS. 9A-9H may be combined with the meal receptacle lifter and lidder of FIGS. 8A-8G.

Figure 10:
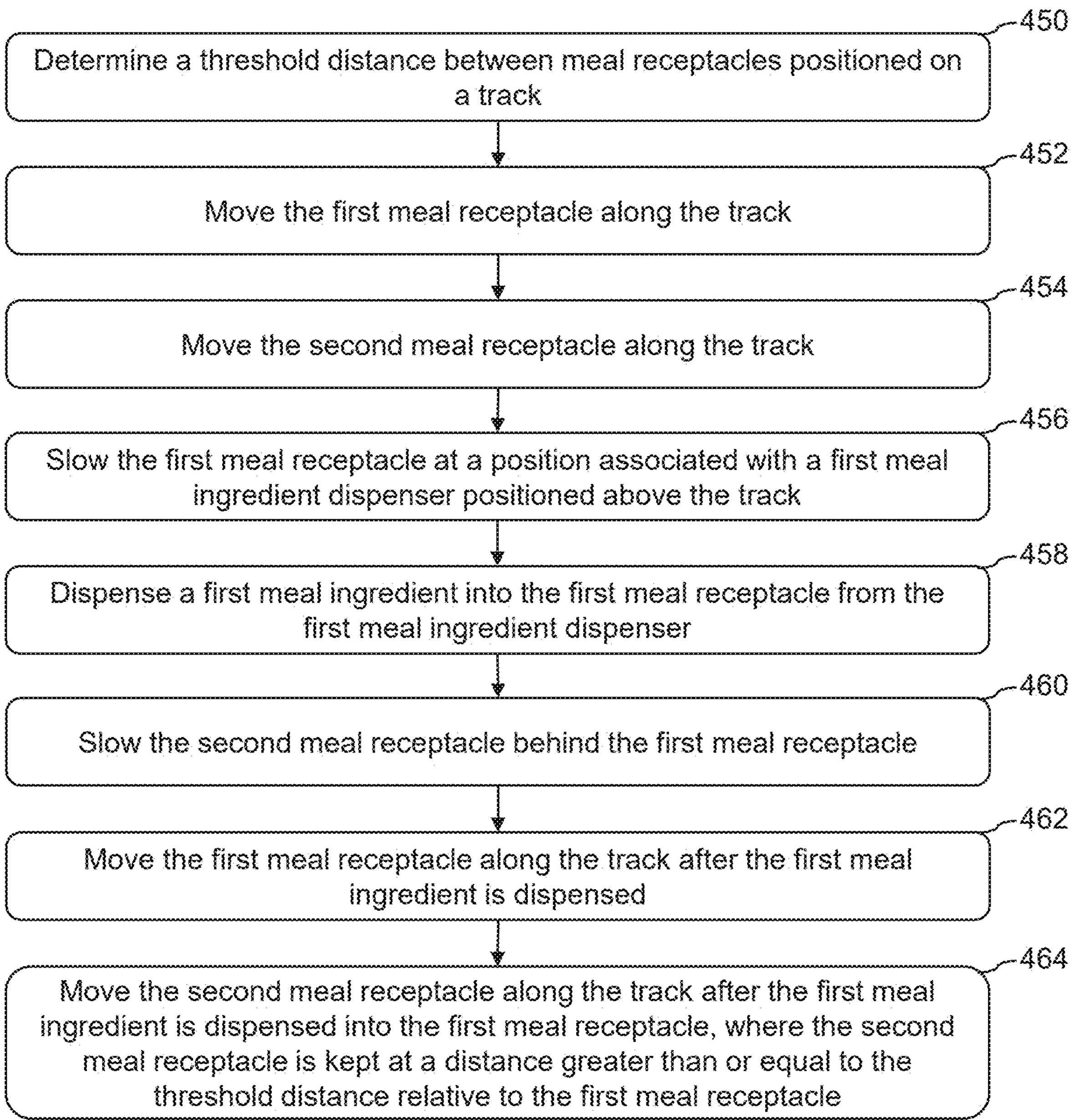
FIG. 10 is a flow chart for another embodiment of a method of operating a meal production system.

FIG. 10 is a flow chart for another embodiment of a method of operating a meal production system. In step 450, a threshold distance is determined between meal receptacles positioned on a track. In some embodiments, the threshold distance may be a collision distance. In step 452, a first meal receptacle is moved along the track. In step 454, a second meal receptacle is moved along the track behind the first meal receptacle. In step 456, the first meal receptacle is slowed at a position associated with a first meal ingredient dispenser positioned above the track. In some embodiments, the first meal receptacle may be stopped at the position associated with the first meal ingredient dispenser. In step 458 a first meal ingredient is dispensed into the first meal receptacle from the first meal ingredient dispenser. In step 460, the second meal receptacle is slowed behind the first meal receptacle. In some embodiments, the second meal receptacle may be stopped behind the first meal receptacle. In step 462, the first meal receptacle is moved along the track after the first meal ingredient is dispensed. In some embodiments the first meal receptacle may be accelerated from a stopped position or slowed speed. In step 464, the second meal receptacle is moved along the track after the first meal ingredient has been dispensed into the first meal receptacle, where the second meal receptacle is kept at a distance greater than or equal to the threshold distance relative to the first meal receptacle. In this manner, the second meal receptacle may closely follow the first meal receptacle without colliding with the first meal receptacle. In some embodiments, the second meal receptacle may bypass the position associated with the first meal ingredient dispenser without stopping or slowing.

Figure 11A:
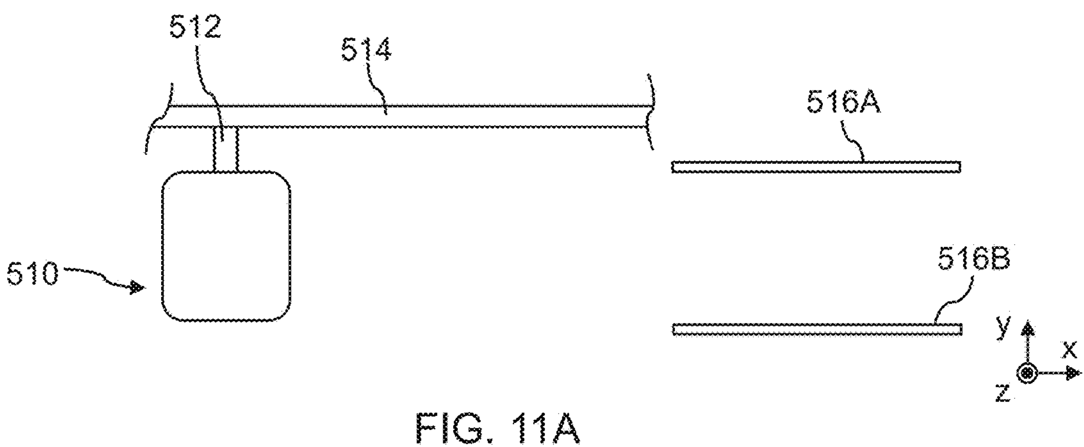
FIG. 11A is a top schematic of another embodiment of a track of a meal production system.
Figure 11B:
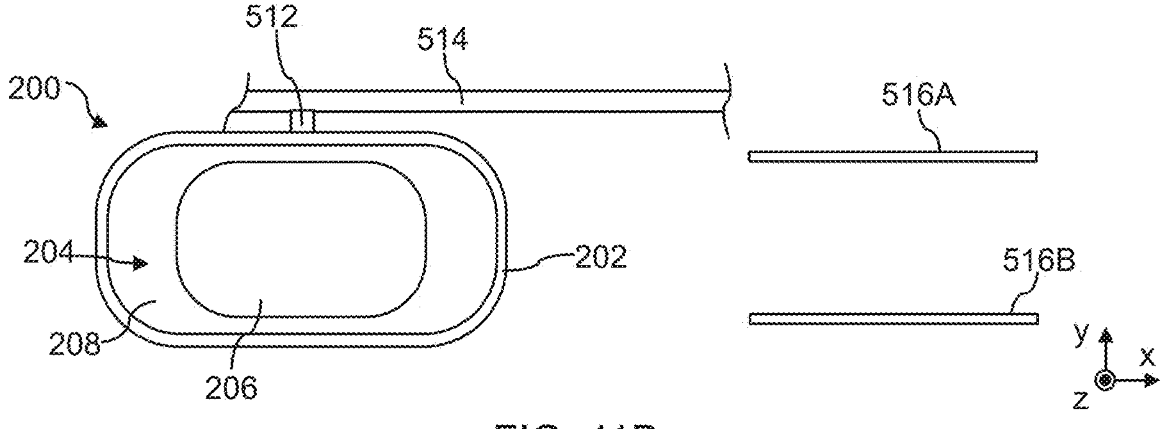
FIG. 11B is a top schematic of the track of FIG. 11A in use with one embodiment of a meal receptacle.
Figure 11C:
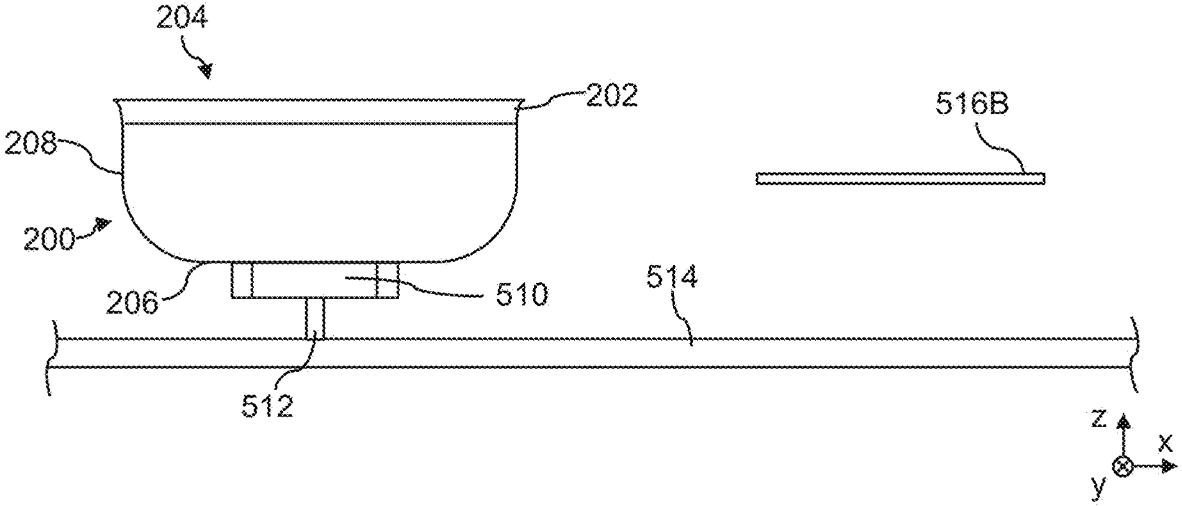
FIG. 11C is a first side schematic of the track and meal receptacle of FIG. 11B in a first state.

FIGS. 11A-11D depict schematics of another embodiment of a track 514 of a meal production system. According to the embodiment of FIGS. 11A-11D, the track 514 includes a meal receptacle holder 510 configured to support a meal receptacle by a bottom portion of the meal receptacle. The meal receptacle holder 510 is supported by a cantilevered support 512, which is moved along the track 514. As shown in FIGS. 11B and 11C, the meal receptacle holder supports a meal receptacle 200 by a bottom portion 206 of the meal receptacle. Accordingly, an exterior portion of the meal receptacle, namely the side walls 208, is physically accessible to a lifter. As shown in FIGS. 11A-11C, the meal receptacle also includes a physically accessible rim 202 surrounding an opening 204 of the meal receptacle.

Figure 11D:
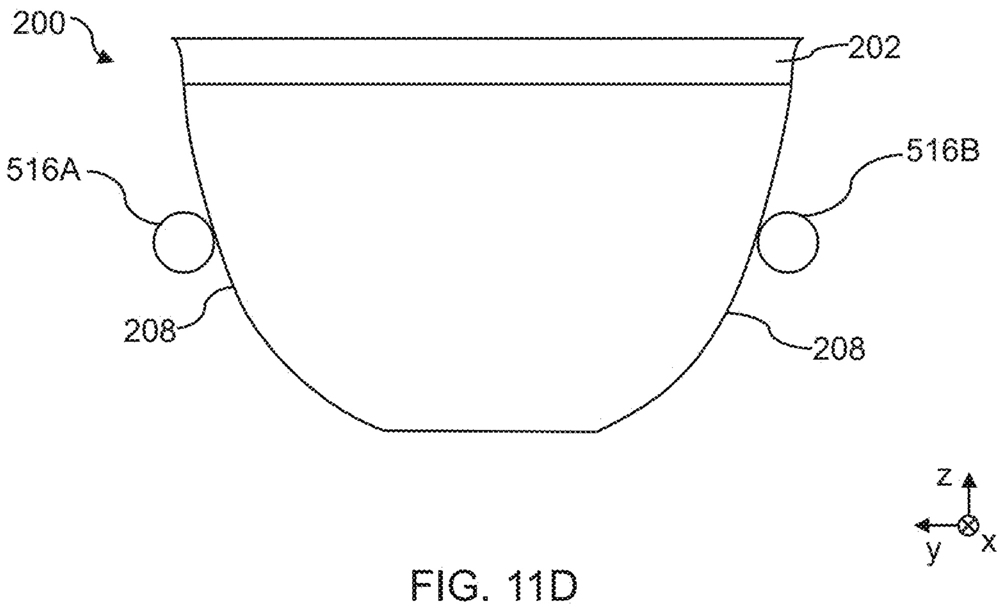
FIG. 11D is a second side schematic of the track and meal receptacle of FIG. 11B in a second state.

According to the embodiments of FIGS. 11A-11D, the meal production system includes a lifter formed by a first rod 516A and a second rod 516B. As shown in FIGS. 11A-11B, the first rod and second rod extend parallel to one another in a direction of travel of the meal receptacle holder 510. The first rod and second rod are spaced from one another such that the first rod and second rod are each configured to engage opposing side walls 208 of the meal receptacle 200. That is, the first rod and second rod are configured to engage an exterior portion of the meal receptacle 200. As shown in FIG. 11D, the first rod and second rod may engage the side walls 208 of the meal receptacle such that the first rod and second rod vertically support the meal receptacle 200. Accordingly, once the meal receptacle is engaged with the first rod and second rod, the meal receptacle holder may move away from the bottom portion of the meal receptacle. While in the embodiment of FIGS. 11A-11D the first rod 516A and second rod 516B are configured to engage side walls 208 of the meal receptacle 200, in other embodiments the first rod and second rod may engage the rim 202 of the meal receptacle or another exterior portion of the meal receptacle, as the present disclosure is not so limited.

According to the embodiment of FIGS. 11A-11D, the lifter formed by first rod 516A and second rod 516B may not actually lift the meal receptacle. Rather, the lifter may replace the support provided by the meal receptacle holder 510, so that the meal receptacle holder may move away from the meal receptacle, leaving the meal receptacle held by the lifter. In some embodiments, when the meal receptacle holder moves out of engagement with the meal receptacle, the meal receptacle holder may slide in contact with the meal receptacle. In other embodiments, the first rod 516A and second rod 516B may be configured to lift the meal receptacle from the meal receptacle holder. For example, the first rod 516A and second rod 516B may be inclined relative to a direction of movement of the meal receptacle holder. In still other embodiments, the lifter may take any suitable configuration that engages an exterior portion of the meal receptacle, as the present disclosure is not so limited.

In some embodiments, once the meal receptacle 200 is positioned on the rods 516A, 516B as shown in FIG. 11D, the bowl may be removed by a human employee. In some embodiments, the meal receptacle holder may push and slide the meal receptacle along the first rod 516A and second rod 516B. As successive meal receptacles 200 are moved onto the parallel rods, each meal receptacle may push the meal receptacle(s) before it on the parallel rods. That is, force from a meal receptacle holder may be transferred to meal receptacles already disposed on the parallel rods that are not in contact with any meal receptacle holders. In this manner, meal receptacles may be sequentially advanced along the first rod and second rod by sliding. In some embodiments, the first rod 516A and second rod 516B may be configured as cables configured to function as a conveyor for an engaged meal receptacle. For example, the first rod 516A and second rod 516B may be cables configured to move in a direction parallel to the direction of movement of the meal receptacle holder 510 (e.g., the x-direction). Accordingly, when the first rod 516A and second rod 516B engage the meal receptacle, the meal receptacle may be removed from the meal receptacle holder under the force of the moving cables. In some embodiments, the cables may move faster than the meal receptacle holder 510, such that the meal receptacle 200 may be reliably removed from the meal receptacle holder once the meal receptacle engages the cables. In some embodiments, the first rod 516A and second rod 516B may be angled at a decline relative to a direction of movement of the meal receptacle holder 510. Accordingly, once the meal receptacle is engaged with the first rod 516A and the second rod 516B and the meal receptacle is no longer supported by the meal receptacle holder 510, the meal receptacle holder may slide along the first rod and second rod under the effect of gravity (e.g., by the meal receptacle's own weight). Thus, lifter may have any suitable arrangement configured to engage an exterior portion of a meal receptacle to remove the meal receptacle from a meal receptacle holder, as the present disclosure is not so limited.

Figure 12:
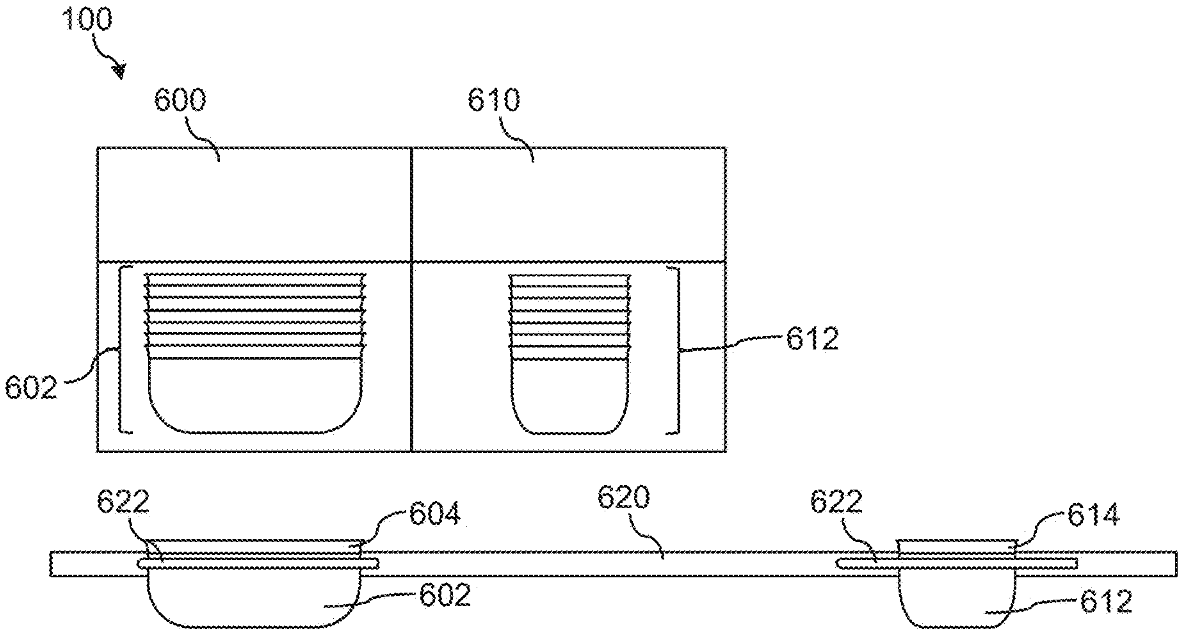
FIG. 12 is a side schematic of one embodiment of a meal production system including multiple meal receptacle dispensers.

FIG. 12 is a side schematic of one embodiment of a meal production system 100 including multiple meal receptacle dispensers. In particular, as shown in FIG. 12, the meal production system includes a first meal receptacle dispenser 600 and a second meal receptacle dispenser 610. According to the embodiment of FIG. 12, the first meal receptacle dispenser 600 is configured to dispense a first meal receptacle 602 and the second meal receptacle dispenser 610 is configured to dispense a second meal receptacle 612. As shown in FIG. 12, the first meal receptacle and second meal receptacle are different sizes of meal receptacle. That is, the first meal receptacle 602 is larger than the second meal receptacle 612 in at least one dimension. Accordingly, the first meal receptacle has a larger volume than the second meal receptacle. As discussed herein, a user may input a meal order which is assembled by the meal production system in a meal receptacle. Depending on the particular order and the volume of ingredients or the type of meal order, the meal production system may assign the meal to be assembled in either a first meal receptacle 602 or a second meal receptacle 612. For example, a meal with a lesser volume may be assigned to a second meal receptacle 612, whereas a larger meal with a greater volume may be assigned to a first meal receptacle 602. As another example, the meal receptacles may be assigned based on meal type. For example, the second meal receptacle 612 may be configured to contain a hot meal and may contain insulation or an otherwise different construction for this purpose, whereas the first meal receptacle 602 may be configured to contain a cold meal. Accordingly, a hot meal may be assigned to a second meal receptacle, while a cold meal may be assigned to a first meal receptacle. Of course, the meal receptacles may different in size, shape, type, construction, or any other desirable characteristic, as the present disclosure is not so limited.

According to the embodiment of FIG. 12, the first meal receptacle dispenser 600 and second meal receptacle dispenser 610 are positioned above a track 620. The track 620 includes a plurality of meal receptacle holders 622. The meal receptacle holders are configured to be conveyed along the track 620 while supporting a meal receptacle. According to the embodiment of FIG. 12, the meal receptacle holders 622 are configured to support both the first meal receptacle 602 and the second meal receptacle 612 interchangeably. That is, the meal receptacle holder 622 are configured to support either the first meal receptacle 602 or second meal receptacle 612. In the embodiment of FIG. 12, the meal receptacle holders 622 are configured to support the first meal receptacle 602 by a rim 604 of the first meal receptacle. Likewise, the meal receptacle holders 622 are configured to support the second meal receptacle 612 by a rim 614 of the meal receptacle. In other embodiments, a track may include different meal receptacle holders for holding differently sized or shaped meal receptacles, as the present disclosure is not so limited.

According to the embodiment of FIG. 12, the first meal receptacle dispenser 600 is configured to drop a single first meal receptacle 602 from a stack of first meal receptacles into a meal receptacle holder 622. Likewise, the second meal receptacle dispenser is configured to drop a single second meal receptacle 612 from a stack of second meal receptacles into a meal receptacle holder. In this manner, one or more meal receptacles may be placed on the track 620 for meal assembly as discussed with reference to other exemplary embodiments herein.

In some embodiments, a meal production system according to the embodiment of FIG. 12 may include a lidder configured to lid the first meal receptacles 602 and the second meal receptacles 612. The lidder may function according to exemplary embodiments described herein. The lidder may include multiple stacks of lids having different sizes, shapes, and/or constructions configured to match the first meal receptacle 602 and second meal receptacle 612. Accordingly, both the first meal receptacles 602 and the second meal receptacles 612 may be lidded by the same lidder. In other embodiments, multiple lidders may be employed in a meal production system, as the present disclosure is not so limited.

While the embodiment of FIG. 12 includes two meal receptacle dispensers for dispensing two different meal receptacles, in other embodiments any suitable number of meal receptacle dispensers may be employed, as the present disclosure is not so limited. Furthermore, any suitable number of meal receptacles differing in one or more characteristics may be employed in a meal production system, as the present disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

A machine controller including one or more processors may communicate with one or more actuators using any suitable communication protocol. For example, a machine controller may communicate with one or more actuators and/or sensors via serial, I2C, SPI, CAN, and/or any other appropriate protocol. A machine controller may receive one or more inputs from one or more users. In some cases, the one or more inputs may be associated with pre-stored computer readable instructions stored on non-volatile memory. Accordingly, the one or more inputs may instruct the machine controller to execute one or more sets of computer readable instructions associated with the inputs. The machine controller may communicate with and control one or more actuators to execute the computer readable instructions.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of operating a meal production system, comprising:

receiving a first meal receptacle on a first meal receptacle holder and receiving a second meal receptacle on a second meal receptacle holder, the first and second meal receptacle holders being positioned on a track;

determining a first threshold distance between the first and second meal receptacles;

determining a second threshold distance between the first and second meal receptacle holders;

moving the first meal receptacle along the track;

moving the second meal receptacle along the track behind the first meal receptacle;

slowing the first meal receptacle at a position associated with a first meal ingredient dispenser positioned above the track;

dispensing a first meal ingredient automatically onto the first meal receptacle from the first meal ingredient dispenser based on a user order;

slowing the second meal receptacle behind the first meal receptacle while keeping the distance between the meal receptacles greater than or equal to the first threshold distance and keeping the distance between the meal receptacle holders greater than or equal to the second threshold distance;

moving the first meal receptacle automatically along the track after the first meal ingredient is dispensed; and moving the second meal receptacle automatically along the track after the first meal ingredient is dispensed into the first meal receptacle wherein the first meal receptacle and the second meal receptacle are movable independently along the track, and wherein the first and second meal receptacles are of a greater length than the first and second meal receptacle holders, respectively, and wherein the length of the meal receptacles and meal receptacle holders is defined as a dimension parallel to a direction of the movement along the track.

2. The method of claim 1, wherein slowing the first meal receptacle includes stopping the first meal receptacle.

3. The method of claim 2, wherein slowing the second meal receptacle includes stopping the second meal receptacle.

4. The method of claim 1, further comprising:

slowing the first meal receptacle at a second position associated with a second meal ingredient dispenser positioned above the track;

dispensing a second meal ingredient onto the first meal receptacle from the second meal ingredient dispenser; and slowing the second meal receptacle behind the first meal receptacle such that the distance between the meal receptacles is greater than or equal to the first threshold distance.

5. The method of claim 4, further comprising:

moving the first meal receptacle after the second meal ingredient is dispensed into the first meal receptacle;

moving the second meal receptacle after the second meal ingredient is dispensed into the first meal receptacle;

bypassing the first meal ingredient dispenser with the second meal receptacle;

slowing the second meal receptacle at the second position; and dispensing the second meal ingredient onto the second meal receptacle.

6. The method of claim 1, wherein the first threshold distance of the meal receptacles is different than the second threshold distance of the meal receptacle holders.

* * * * *